United States Patent
Jeong et al.

(10) Patent No.: US 10,782,914 B2
(45) Date of Patent: Sep. 22, 2020

(54) BUFFER SYSTEMS AND METHODS OF OPERATING THE SAME

(71) Applicant: SK hynix Inc., Icheon-si, Gyeonggi-do (KR)

(72) Inventors: Seunggyu Jeong, Icheon-si (KR); Jung Hyun Kwon, Seoul (KR); Wongyu Shin, Icheon-si (KR); Do-Sun Hong, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 222 days.

(21) Appl. No.: 16/003,927

(22) Filed: Jun. 8, 2018

(65) Prior Publication Data

US 2019/0187927 A1    Jun. 20, 2019

(30) Foreign Application Priority Data

Dec. 20, 2017   (KR) .......................... 10-2017-0176471

(51) Int. Cl.
*H04L 12/28* (2006.01)
*G06F 3/06* (2006.01)

(52) U.S. Cl.
CPC .......... *G06F 3/0656* (2013.01); *G06F 3/0611* (2013.01); *G06F 3/0673* (2013.01)

(58) Field of Classification Search
None
See application file for complete search history.

(56) References Cited

U.S. PATENT DOCUMENTS

| 8,792,511 | B2 | 7/2014 | Raikar et al. | |
|---|---|---|---|---|
| 2005/0129044 | A1* | 6/2005 | Katayama | H04L 47/10 370/412 |
| 2012/0263181 | A1* | 10/2012 | Raikar | H04L 49/9005 370/394 |
| 2014/0149694 | A1* | 5/2014 | Lee | G06F 5/12 711/159 |

FOREIGN PATENT DOCUMENTS

KR    1020140067740 A    6/2014

* cited by examiner

*Primary Examiner* — Ryan Bertram
*Assistant Examiner* — Trang K Ta
(74) *Attorney, Agent, or Firm* — William Park & Associates Ltd.

(57) ABSTRACT

A buffer system may include a buffer configured to receive input data having an assigned priority level, store the input data within a memory stack regardless of the priority level assigned to the input data, and sequentially output the input data stored in the memory stack in order of the priority levels assigned to the input data.

19 Claims, 23 Drawing Sheets

BUFFER SYSTEMS AND METHODS OF OPERATING THE SAME

CROSS-REFERENCE TO RELATED APPLICATIONS

The present application claims priority under 35 U.S.C 119(a) to Korean Application No. 10-2017-0176471, filed on Dec. 20, 2017, which is herein incorporated by references in its entirety.

BACKGROUND

1. Technical Field

Various embodiments of the present disclosure generally relate to buffer systems, and more particularly, to buffer systems for quality of service control and methods of operating the same.

2. Related Art

In memory systems, it may be ideal that a memory in each memory system is realized using an on-chip memory which is capable of being utilized locally. However, the memory system generally employs an external low power memory which is controlled by a memory controller because of a limitation in increasing a storage capacity of the on-chip memory and manufacturing costs of the on-chip memory. In such a case, a usable band width of the external low power memory may be restricted due to a limitation of electric power of the external low power memory. A transaction of the memory system may depend on access to the external memory. A system master needs to receive detailed operation characteristics from data on the memory system in order to execute functions. The operation characteristics of the data may be regarded as a contract between the system master and the memory system. However, the operation characteristics, that is, the contract may be different according to bus masters. Some of the masters may be self-regulated in response to a data request. That is, some of the masters may request a specific bandwidth with a certain delay time for each transaction. In general, a FIFO buffer may be supported to provide flexibility for accepting variation of a transaction delay time.

An arbitration policy of a system may be generally set to determine correct priority levels of various transactions for efficient communication without any errors if the system is over-loaded with a lot of data which are greater than an allowed capacity. One of the various transactions may be more important than another one of the various transactions. In such a case, the various transactions may be encoded so that the important one of the transactions has a higher priority level. However, the priority levels of the transactions may vary as the time elapses. Thus, reassigning relative priority levels to the various transactions may be required to control the QoS of the system. Generally, in order to control the QoS of the system, the system may be configured so that a plurality of data having different priority levels are respectively inputted to a plurality of memories constituting a FIFO buffer and a data having a relatively high priority level is outputted from the FIFO buffer earlier than a data having a relatively low priority level by a scheduler. However, in such a case, even though each of the memories has an enough storage capacity, the efficiency of the system may be degraded because a portion of each memory remains as unused or idle source (i.e., an empty state) if no data having the corresponding priority level is inputted to the FIFO buffer.

SUMMARY

According to an embodiment, there is provided a buffer system. The buffer system may include a classifier and a buffer. The classifier may sort input data into a plurality of groups that respectively correspond to a plurality of priority levels and output the sorted input data. The buffer may store the sorted data outputted from the classifier and output the stored data according to a FIFO scheme. The buffer may include a memory stack configured to include a plurality of storage elements, a first register stack configured to include information on an output sequence of data stored in the plurality of storage elements, and a second register stack configured to include information on storage location of the sorted data outputted from the classifier when the sorted data are stored into the plurality of storage elements. Each of the plurality of storage elements may store one of the sorted data outputted from the classifier.

According to an embodiment, there is provided a buffer system. The buffer system may include a buffer configured to receive input data having an assigned priority level, store the input data within a memory stack regardless of the priority level assigned to the input data, and sequentially output the input data stored in the memory stack in order of the priority levels assigned to the input data.

According to an embodiment, there is provided a method of operating a buffer system. The method may include receiving input data having an assigned priority level. The method may include storing the input data within a memory stack regardless of the priority level assigned to the input data. The method may include sequentially outputting the input data stored in the memory stack in order of the priority levels assigned to the input data.

DETAILED DESCRIPTION

In the following description of the embodiments, it will be understood that the terms "first" and "second" are intended to identify an element, but not used to define only the element itself or to mean a particular sequence. In addition, when an element is referred to as being located "on", "over", "above", "under" or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below" and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may form a connection relationship or coupling relationship by replacing the other element therebetween.

Various embodiments may be directed to buffer systems for QoS control. In some embodiments, the buffer systems may be implemented by using a FIFO buffer system architecture. For some embodiments, the described functionality of the buffer system as described herein (i.e., see FIG. 1) can be implemented using a first in first out buffer system 100. In other embodiments, the described functionality of the buffer system may be implemented with hardware other than the hardware of the FIFO buffer system 100. In some embodiments, the buffer systems may include buffers. In some embodiments, the buffers may be implemented by using a FIFO buffer architecture. For some embodiments, the described functionality of the buffer as described herein (i.e., see FIG. 1) can be implemented using a first-in first-out (FIFO) buffer 300. In other embodiments, the described functionality of the buffer may be implemented with hardware other than the hardware of the FIFO buffer 300.

Figure 1:
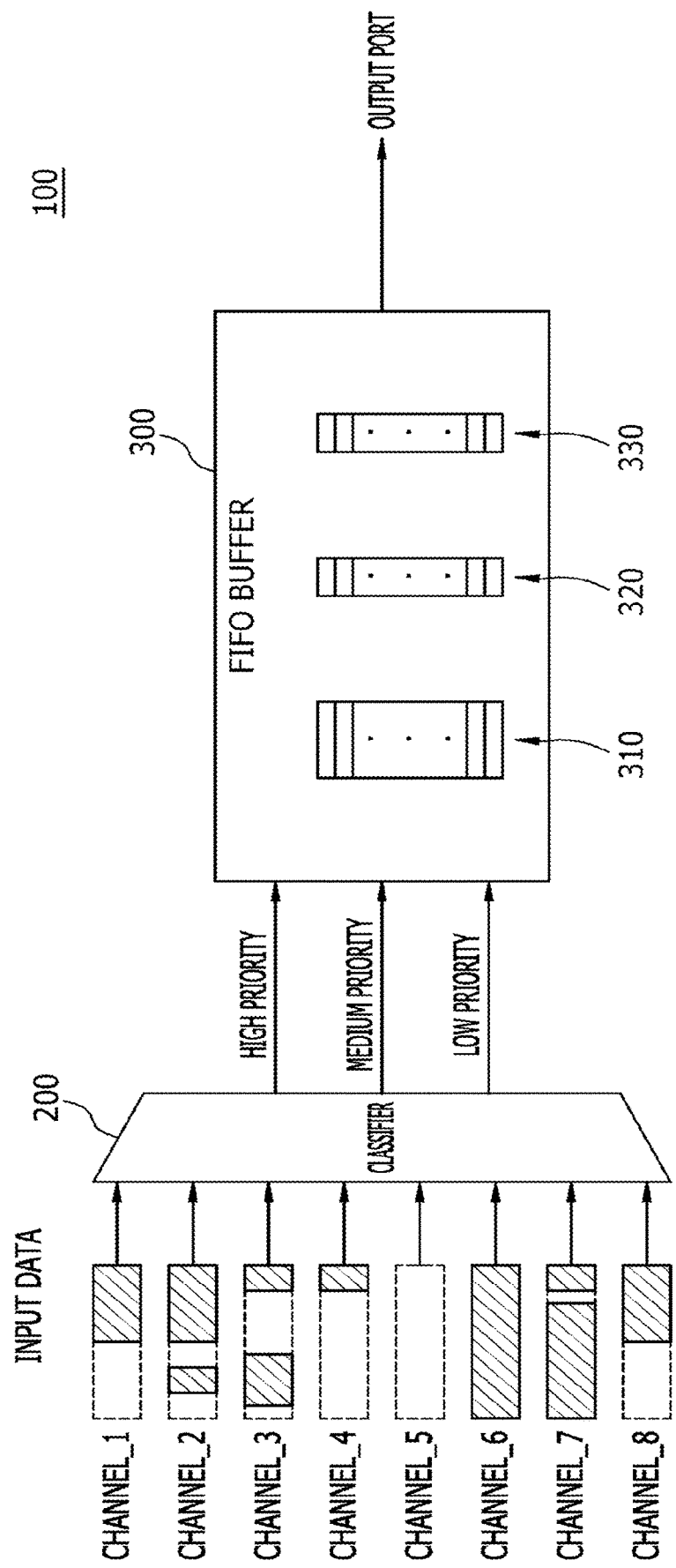
FIG. 1 is a schematic view illustrating a first-in first-out (FIFO) buffer system according to an embodiment of the present disclosure.

FIG. 1 is a schematic view illustrating an example of an embodiment of a buffer system. For example, in an embodiment, the buffer system may be a FIFO buffer system 100. Referring to FIG. 1, the FIFO buffer system 100, in an embodiment, for example, may be configured to include a classifier 200 and a FIFO buffer 300. The classifier 200 may sort input data which are inputted thereto. The input data applied to the classifier 200 may be distinguished from each other by a plurality of channels, for example, first to eighth input channels CHANNEL_1~CHANNEL_8. The input data may be transmitted through the first to eighth input channels CHANNEL_1~CHANNEL_8, and the first to eighth input channels CHANNEL_1~CHANNEL_8 may be defined as data transmission paths whose data process schemes are different from each other. In an embodiment, the first to eighth input channels CHANNEL_1~CHANNEL_8 may be distinguished from each other by sources generating the input data. In another embodiment, the first to eighth input channels CHANNEL_1~CHANNEL_8 may be distinguished from each other by transmission routes through which the input data are transmitted. Output data of the classifier 200 may be outputted through a single output channel.

The classifier 200 may sort the input data into a plurality of groups having different priority levels according to priority levels of the input data and may output the sorted input data having different priority levels. In an embodiment, the data outputted from the classifier 200 may include the input data and information on the priority levels assigned to the input data. In an embodiment, the classifier 200 may sort the input data into three groups having different priority levels, for example, a high priority level, a medium priority level and a low priority level and may output the three groups of data. For example, the input data inputted to the classifier 200 through the third input channel CHANNEL_3 may be classified to have a high priority level, and the input data inputted to the classifier 200 through the second, fifth and sixth input channels CHANNEL_2, CHANNEL_5 and CHANNEL_6 may be classified to have a medium priority level. In addition, the input data inputted to the classifier 200 through the first, fourth, seventh and eighth input channels CHANNEL_1, CHANNEL_4, CHANNEL_7 and CHANNEL_8 may be classified to have a low priority level. In an embodiment, for example, the classifier 200 may be implemented with software, hardware, or any combination thereof.

The FIFO buffer 300 may be configured to include a memory stack 310, a first register stack 320 and a second register stack 330. The memory stack 310 may operate using a FIFO design scheme. In order that the memory stack 310 operates using a FIFO design scheme, the memory stack 310 may have a plurality of storage elements, an input port and an output port. In an embodiment, the memory stack 310 may be realized using a static random access memory (SRAM). In such a case, the storage elements of the memory stack 310 may correspond to memory cells of the SRAM. The input port of the memory stack 310 may be coupled to the classifier 200, and the output port of the memory stack 310 may constitute an output terminal of the memory stack 310. The storage elements included in the memory stack 310 may have their own addresses, respectively.

The data outputted from the classifier 200 may be sequentially stored into the storage elements of the memory stack 310 by a push command. In such a case, although the data outputted from the classifier 200 have different priority levels assigned by the classifier 200, the data outputted from the classifier 200 may be stored into the storage elements of the memory stack 310 regardless of the priority levels thereof. That is, whenever the data outputted from the classifier 200 are stored into the storage elements of the memory stack 310, the data outputted from the classifier 200 may be sequentially stored into the memory stack 310 from the storage element having a lowest-order address up to the storage element having a highest-order address, without any consideration of the priority levels of the data outputted from the classifier 200. In some cases, the data outputted from the classifier 200 may be stored into the storage element (of the memory stack 310) having an address stored in one of second registers (included in the second register stack 330) which is indicated by a push pointer. Even in this case, the storage of the data outputted from the classifier 200 may be achieved regardless of the priority levels of the data outputted from the classifier 200. Thus, all of the storage elements of the memory stack 310 may be efficiently utilized regardless of an amount of data belonging to each of the priority levels of the data outputted from the classifier 200. When a certain data having a certain priority level is stored into a storage element of the memory stack 310, a level end pointer may be provided to have an address of the storage element storing the certain data if the certain data corresponds to a last data among the previous data having the certain priority level stored in the memory stack 310. The storage of the data outputted from the classifier 200 may be executed until all of the storage elements of the memory stack 310 are filled with the data outputted from the classifier 200. If a pop command occurs during a push operation even before all of the storage elements of the memory stack 310 are entirely filled with the data, an operation for storing the data into the memory stack 310 may be interrupted.

The first register stack 320 may be configured to include a plurality of first registers. The number of the first registers constituting the first register stack 320 may be equal to the number of the storage elements constituting the memory stack 310. Thus, the first registers of the first register stack 320 may be matched with the storage elements of the memory stack 310, respectively. In an embodiment, one of the storage elements of the memory stack 310 and one of the first registers of the first register stack 320 may be matched with each other to have the same address. That is, a first one of the storage elements in the memory stack 310 may be matched with a first one of the first registers in the first register stack 320. Accordingly, the first one of the storage elements in the memory stack 310 and the first one of the first registers in the first register stack 320 may have the same address. Similarly, an $M^{th}$ one of the storage elements in the memory stack 310 may be matched with an $M^{th}$ one of the first registers in the first register stack 320. Thus, the $M^{th}$ one of the storage elements of the memory stack 310 and the $M^{th}$ one of the first registers of the first register stack 320 may have the same address. An address of any one of the storage elements constituting the memory stack 310 may be stored in one of the first registers in the first register stack 320. In an embodiment, for example, the number of first registers may be equal to or greater the number of storage elements as well as the number of second registers to have a greater amount of first registers than whichever stack has more of an amount of storage elements or second registers.

When the data outputted from the classifier 200 is stored into any one of the storage elements of the memory stack 310 by a push command, a pop pointer may be created to indicate one of the first registers, which notifies a location of the storage element in which a first data among a plurality of data having a highest priority level is stored. The data stored in the storage element matched with the first register indicated by the pop pointer may be firstly outputted during a pop operation. If an initial data is inputted to the memory stack 310 after the FIFO buffer 300 is initialized, the pop pointer may be created to indicate any one of the first registers, which is matched with the storage element in which the initial data is stored. The term "initial data" means a data that is firstly inputted to the memory stack 310 after the FIFO buffer 300 is initialized. If the previous data stored in the memory stack 310 do not include any data having the same priority level as the data inputted to the memory stack 310 and the priority level of the data inputted to the memory stack 310 is higher than the priority levels of the previous data stored in the memory stack 310 after the initial data is stored in the memory stack 310, the pop pointer may be recreated to indicate any one of the first registers, which is matched with the storage element in which the data inputted to the memory stack 310 is stored. In other cases, the pop pointer may maintain its previous state without any change.

The second register stack 330 may be configured to include a plurality of registers. The number of the registers constituting the second register stack 330 may be equal to the number of the storage elements constituting the memory stack 310. Thus, the number of the storage elements of the memory stack 310, the number of the first registers of the first register stack 320, and the number of the second registers of the second register stack 330 may be the same. The second registers of the second register stack 330 may be matched with the storage elements of the memory stack 310, respectively. In an embodiment, one of the storage elements of the memory stack 310 and one of the second registers of the second register stack 330 may be matched with each other to have the same address. That is, a first one of the storage elements in the memory stack 310 may be matched with a first one of the second registers in the second register stack 330. Accordingly, the first one of the storage elements in the memory stack 310 and the first one of the second registers in the second register stack 330 may have the same address. Similarly, an $M^{th}$ one of the storage elements in the memory stack 310 may be matched with an $M^{th}$ one of the second registers in the second register stack 330. Thus, the $M^{th}$ one of the storage elements of the memory stack 310 and the $M^{th}$ one of the second registers of the second register stack 330 may have the same address. An address of any one of the storage elements constituting the memory stack 310 may be stored in one of the second registers in the second register stack 330. In an embodiment, for example, the number of second registers may be equal to or greater the number of storage elements as well as the number of first registers to have a greater amount of second registers than whichever stack has more of an amount of storage elements or first registers.

When the data outputted from the classifier 200 is stored into any one of the storage elements of the memory stack 310 by a push command, a push pointer may be created to indicate the second register having an address of the storage element in which a next data is stored. If an initial data is inputted to the memory stack 310 after the FIFO buffer 300 is initialized, the push pointer may be created to indicate a first one of the second registers in the second register stack 330. After the initial data is stored into the memory stack 310, the address of the second register indicated by the push pointer may increase whenever the data is stored into the memory stack 310. The push pointer may be changed only when the push operation is performed and may not be changed when the pop operation is performed.

Figure 2:
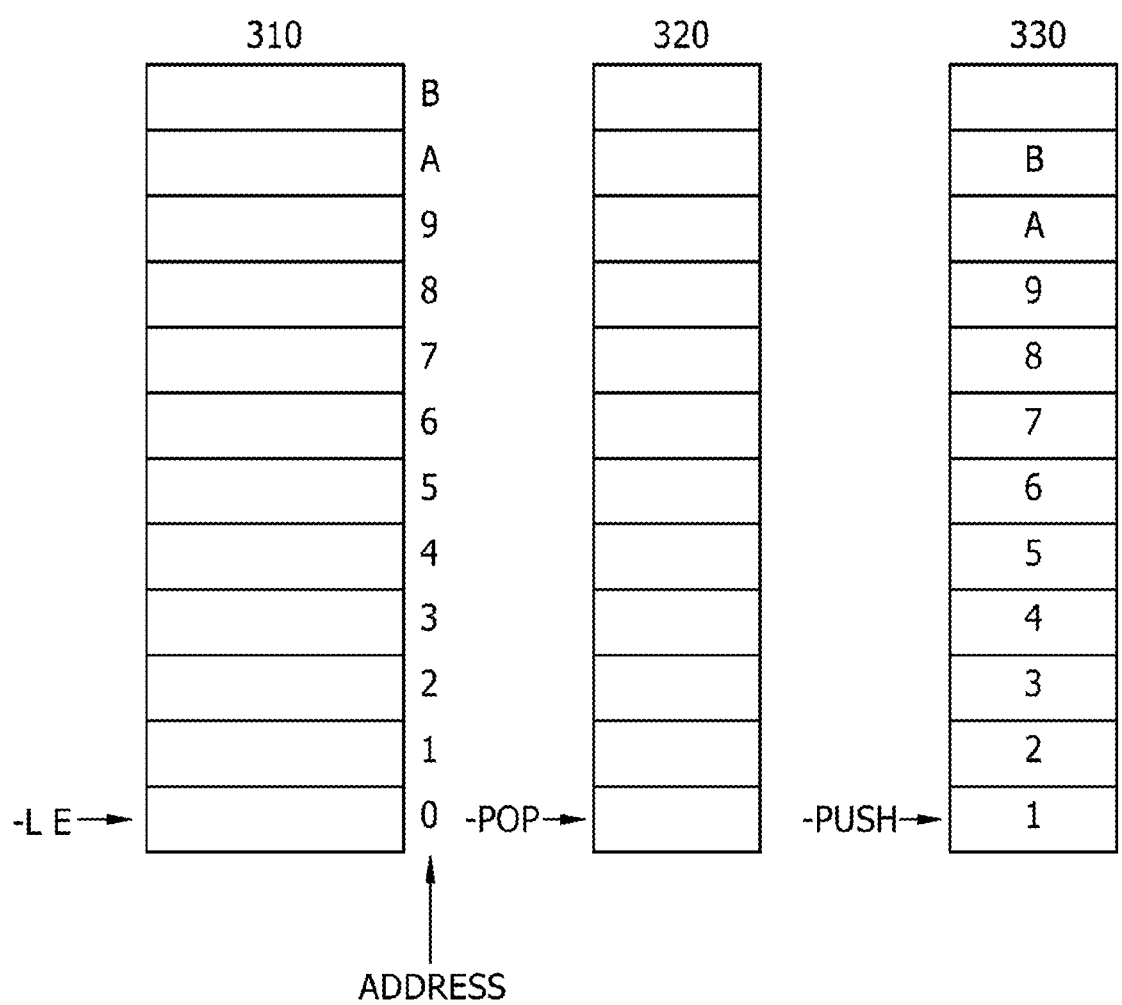
FIG. 2 is a schematic view illustrating an initialized state of a FIFO buffer included in the FIFO buffer system of FIG. 1.

FIG. 2 is a schematic view illustrating an initialized state of the FIFO buffer 300 included in the FIFO buffer system 100 of FIG. 1. An embodiment may correspond to an example in which the number of the storage elements in the memory stack 310, the number of the first registers in the first register stack 320, and the number of the second registers in the second register stack 330 are all twelve. Referring to FIG. 2, the memory stack 310 may have a plurality of storage elements, that is, twelve storage elements. The plurality of storage elements may have a series of addresses from a lowest-order address to a highest-order address, respectively. That is, a first one of the storage elements may have a lowest-order address, and a twelfth one of the storage elements may have a highest-order address. In an embodiment, the first one to the twelfth one of the storage elements may have addresses of '0', '1', '2', . . . , '9', 'A' and 'B', respectively. At the initialized state of the FIFO buffer 300, all of the storage elements of the memory stack 310 may maintain empty states without any data before the push operation is performed. At the initialized state of the FIFO buffer 300, all of the first registers of the first register stack 320 may also maintain empty states without any data before the push operation is performed. In contrast, at the initialized state of the FIFO buffer 300, addresses of '1' to 'B' may be sequentially and respectively stored in the first one to the eleventh one of the second registers. In such a case, a last one of the second registers, that is, the twelfth one of the second registers may have an empty state without any address.

If a certain data having any one of various priority levels is inputted to the memory stack 310 by a push command after the FIFO buffer 300 is initialized, the certain data may be stored into the first one of the storage elements, which has a lowest-order address, regardless of the priority level of the certain data. If the certain data is stored into the memory stack 310 by the push command, an address of any one of the storage elements set by a predetermined process may be stored into one of the first registers of the first register stack 320. After the push operation is repeatedly performed to store various data in the memory stack 310, the data stored in the memory stack 310 may be outputted according to priority levels of the data and the addresses stored in the first registers in subsequent pop operations. The predetermined process for setting the addresses stored into the first registers will be described with reference to FIG. 4 later. Even though the push operations are performed after the FIFO buffer 300 is initialized, set values stored in the second registers constituting the second register stack 330 may not be changed until a pop operation is performed.

If data having a specific priority level is inputted to the memory stack 310 by a push command, a level end pointer -L_E of the specific priority level may be created to indicate the storage element in which the data having the specific priority level is stored. If an initial data is stored into the first one of the storage elements of the memory stack 310 by a push operation after the FIFO buffer 300 is initialized, a push pointer -PUSH may be set to indicate a first one of the second registers of the second register stack 330. Subsequently, whenever a subsequent data is stored into the memory stack 310, the push pointer -PUSH may be recreated to indicate the second register having an address of the storage element in which a next input data is stored. If data inputted to the memory stack 310 is an initial data after the FIFO buffer 300 is initialized, a pop pointer -POP may be created to indicate the first register which is matched with the storage element in which the initial data is stored. If the previous data stored in the memory stack 310 do not include any data having the same priority level as the data inputted to the memory stack 310 and the priority level of the data inputted to the memory stack 310 is higher than the priority levels of the previous data stored in the memory stack 310 after the initial data is stored in the memory stack 310, the pop pointer -POP may be recreated to indicate the first register which is matched with the storage element in which the data inputted to the memory stack 310 is stored.

Figure 3:
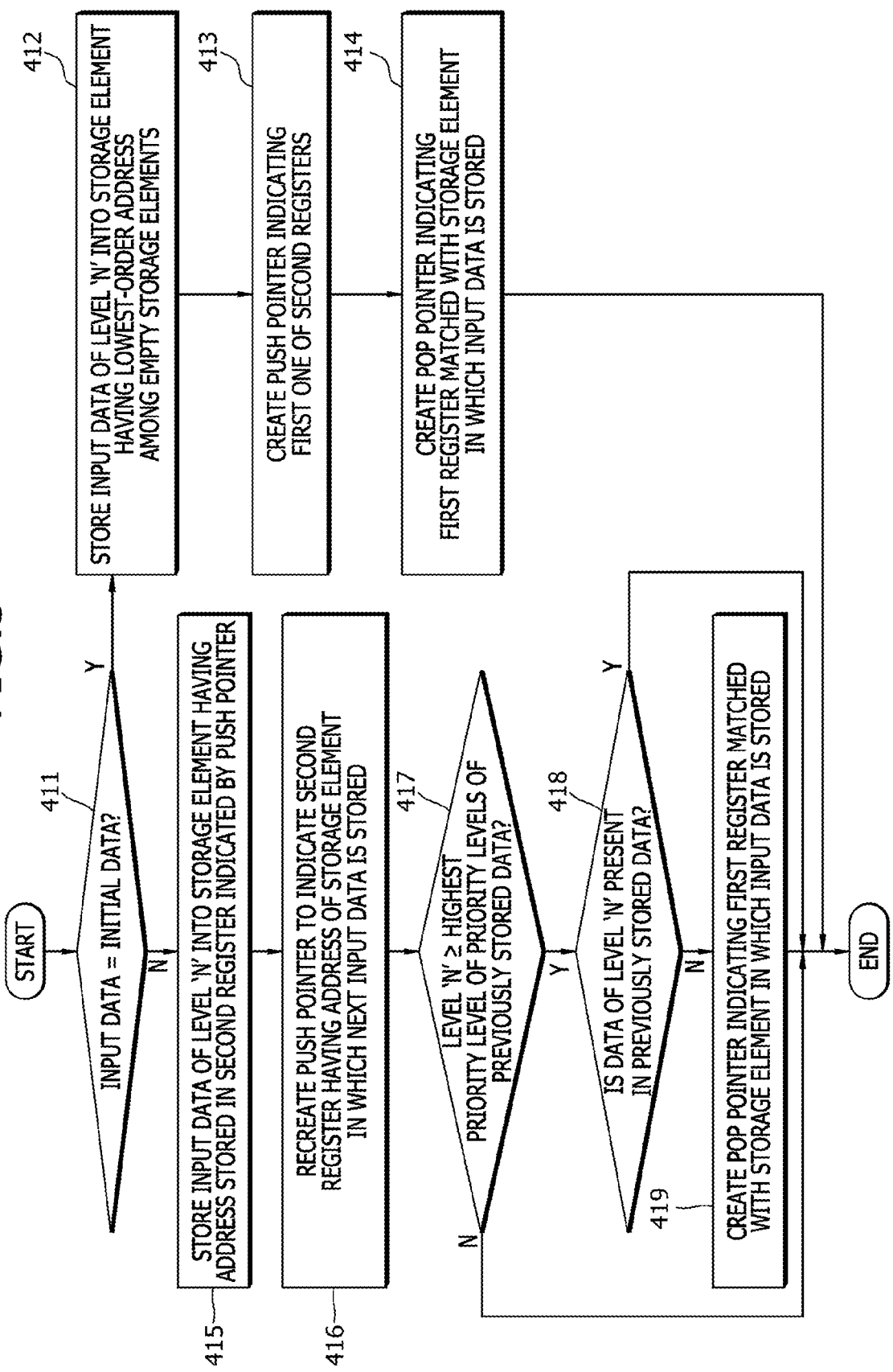
FIG. 3 is a flowchart illustrating a process of storing input data during a push operation and a process of setting a pop pointer and a push pointer using the FIFO buffer system illustrated in FIG. 1 including the initialized FIFO buffer of FIG. 2.

FIG. 3 is a flowchart illustrating a process of storing the input data in the memory stack 310 during the push operation and a process of creating the pop pointer -POP and the push pointer -PUSH using the FIFO buffer system 100 illustrated in FIG. 1 including the initialized FIFO buffer 300 of FIG. 2. Referring to FIG. 3, if the input data having any one (e.g., a level 'N') of a plurality of priority levels is inputted to the memory stack 310 after the FIFO buffer 300 is initialized, whether the input data is an initial data may be discriminated (see a step 411). If the input data is the initial data at the step 411, the input data having the level 'N' may be stored into the storage element having a lowest-order address among the empty storage elements of the memory stack 310 (see a step 412). In such a case, the push pointer -PUSH may be created to indicate a first one of the second registers of the second register stack 330 (see a step 413). In addition, the pop pointer -POP may be created to indicate the first register which is matched with the storage element in which the input data is stored (see a step 414).

If the input data is not the initial data at the step 411, the input data having the level 'N' may be stored into the storage element having an address stored in the second register indicated by the push pointer -PUSH (see a step 415). In such a case, the push pointer -PUSH may be recreated to indicate the second register having an address of the storage element in which a next input data is stored (see a step 416). For example, the address of the storage element in which the next input data is stored may be obtained by adding one to the address stored in the second register indicated by the current push pointer -PUSH. Subsequently, the level 'N' of the input data may be compared with a highest priority level among the priory levels of previous data stored in the memory stack 310 (see a step 417). If the level 'N' of the input data is lower than the highest priority level of the previous data stored in the memory stack 310, the pop pointer -POP may maintain its previous state without any change. If the level 'N' of the input data is equal to or higher than the highest priority level of the previous data stored in the memory stack 310 at the step 417, whether the previous data stored in the memory stack 310 include the data having the same priority level as the level 'N' of the input data may be discriminated (see a step 418). If the previous data stored in the memory stack 310 include at least one data having the same priority level as the level 'N' of the input data, the pop pointer -POP may maintain its previous state without any change. However, if no data having the same priority level as the level 'N' of the input data is present in the previous data stored in the memory stack 310, the pop pointer -POP may be recreated to indicate the first register which is matched with the storage element in which the input data having the level 'N' is stored (see a step 419). That is, if the input data corresponds to a first input data having the level 'N', the pop pointer -POP may be recreated to indicate the first register which is matched with the storage element in which the input data having the level 'N' is stored.

Figure 4:
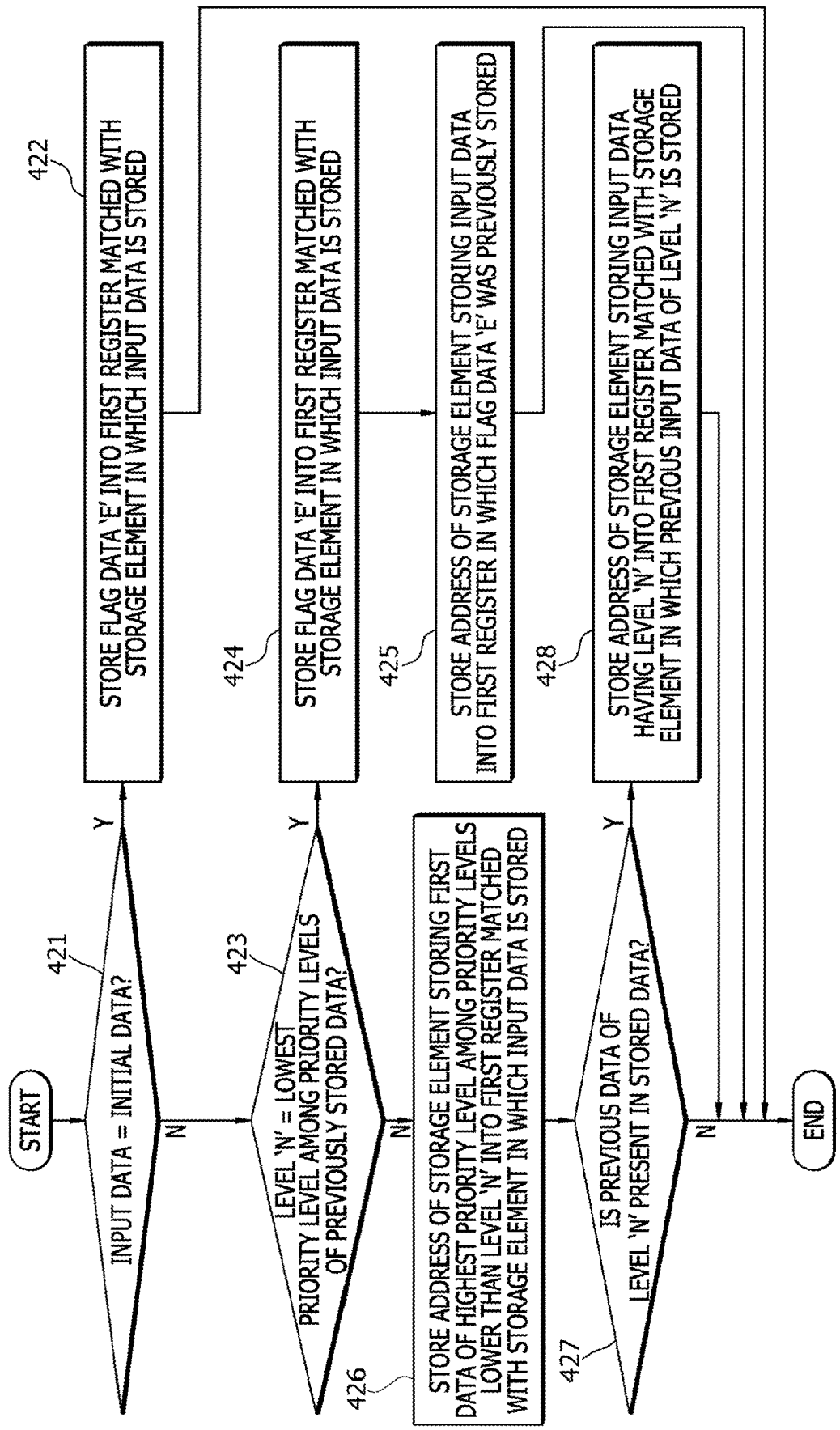
FIG. 4 is a flowchart illustrating a process of setting an address in a first register stack during a push operation with the FIFO buffer system illustrated in FIG. 1 including the initialized FIFO buffer of FIG. 2.

FIG. 4 is a flowchart illustrating a process of setting addresses in the first register stack 320 during the push operation with the FIFO buffer system 100 illustrated in FIG. 1 including the initialized FIFO buffer 300 of FIG. 2. Referring to FIG. 4, if the input data having the level 'N' is inputted to the memory stack 310 after the FIFO buffer 300 is initialized, whether the input data is an initial data may be discriminated (see a step 421). If the input data is the initial data at the step 421, a flag data 'E' may be stored into the first register which is matched with the storage element in which the input data is stored (see a step 422). In an embodiment, the flag data 'E' may be an end flag data denoting that all of data having a lowest priority level are outputted during the pop operation. Thus, if the data stored in the storage element corresponding to the first register in which the flag data 'E' is stored is outputted during a subsequent pop operation, it may mean that all of the input data having the lowest priority level are outputted from the memory stack 310. If the input data is not the initial data at the step 421, whether the level 'N' of the input data is a lowest priority level among the priority levels of the previous data stored in the memory stack 310 may be discriminated (see a step 423).

If the level 'N' of the input data is the lowest priority level among the priority levels of the previous data in the memory stack 310 at the step 423, the flag data 'E' may be stored into the first register that is matched with the storage element in which the input data is stored (see a step 424). In such a case, an address of the storage element in which the input data is stored may be stored into the first register in which the flag data 'E' was previously stored (see a step 425). If the level 'N' of the input data is different from the lowest priority level among the priority levels of the previous data in the memory stack 310 at the step 423, an address of the storage element storing the first one among the data having a highest priority level among the priority levels lower than the level 'N' may be stored into the first register matched with the storage element in which the input data having the level 'N' is stored (see a step 426). That is, if the data having the priority level lower than the level 'N' exists in the memory stack 310, the address of the storage element storing the first one among the data having a highest priority level among the priority levels lower than the level 'N' may be stored into the first register matched with the storage element in which the input data having the level 'N' is stored (see a step 426). Subsequently, whether the previous data stored in the memory stack 310 include the data having the same priority level as the level 'N' of the input data may be discriminated (see a step 427). If the previous data stored in the memory stack 310 include the data having the same priority level as the level 'N' of the input data at the step 427, an address of the storage element storing the input data may be stored into the first register which is matched with the storage element in which the last one among the previous data having the same priority level as the level 'N' is stored (see a step 428).

FIGS. 5 to 13 illustrate an example of a push operation performed using the initialized FIFO buffer 300 illustrated in FIG. 2. An embodiment will be described in conjunction with an example in which the priority levels include four distinct levels of a level zero L0, a level one L1, a level two L2 and a level three L3. The level zero L0 may denote a lowest priority level, and the level one L1 may denote a priority level higher than the level zero L0. In addition, the level two L2 may denote a priority level higher than the level one L1, and the level three L3 may denote a priority level higher than the level two L2. Accordingly, the level three L3 may correspond to a highest priority level among the level zero L0, the level one L1, the level two L2 and the level three L3. Thus, while the data in the memory stack 310 are outputted, the data having the level three L3, the data having the level two L2, the data having the level one L1 and the data having the level zero L0 have to be sequentially outputted. In an embodiment, it may be assumed that the memory stack 310 includes twelve storage elements, the first register stack 320 includes twelve first registers, and the second register stack 330 includes twelve second registers. In an embodiment, the storage element, the first register and the second register, which are matched with each other, may have the same address. The embodiments illustrated in FIGS. 5 to 13 are merely an example of the present disclosure. Thus, the concepts of the present disclosure may also be applicable to other examples in which the number of the priority levels is less than or greater than four and/or the number of the storage elements, the first registers or the second registers is less than or greater than twelve.

Figure 5:
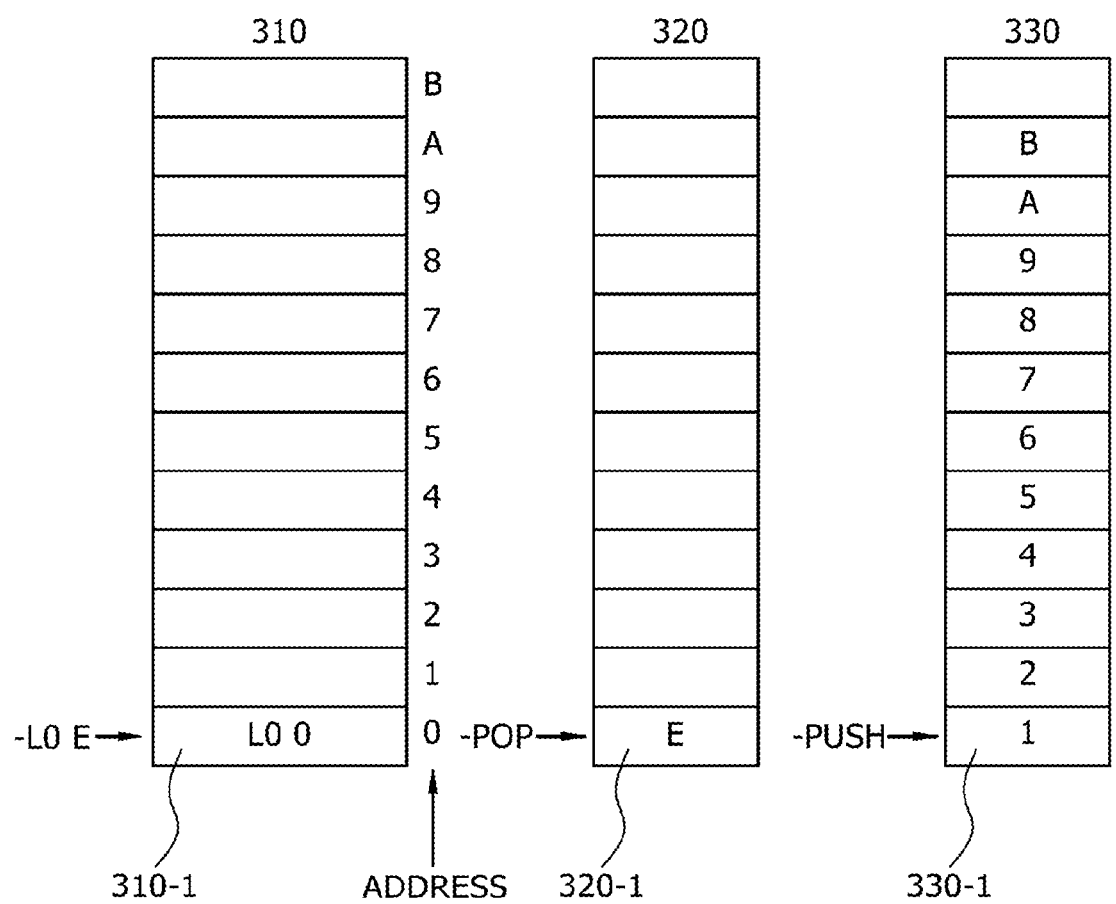
FIGS. 5 to 13 illustrate an example of a push operation performed using the initialized FIFO buffer illustrated in FIG. 2.

Referring to FIGS. 3, 4 and 5, it may be assumed that a first data L0_0 having the level zero L0 is inputted to the memory stack 310 as the input data after the memory stack 310, the first register stack 320 and the second register stack 330 are initialized. Since the first data L0_0 of the level zero L0 corresponds to the initial data, the first data L0_0 may be stored into a first one 310-1 of the storage elements, which is assigned to have a lowest-order address '0'. A level zero end pointer –L0_E may be created to indicate the first storage element 310-1 in which the first data L0_0 of the level zero L0 is stored. A push pointer –PUSH may be created to indicate a first one 330-1 of the second registers according to the step 413 of FIG. 3. In addition, a pop pointer –POP may be created to indicate a first one 320-1 of the first registers, which is matched with the first storage element 310-1 in which the first data L0_0 of the level zero L0 is stored, according to the step 414 of FIG. 3. In such a case, an end flag data 'E' may be stored into the first one 320-1 of the first registers, which is matched with the first storage element 310-1 in which the first data L0_0 of the level zero L0 is stored, according to the step 422 of FIG. 4.

Figure 6:
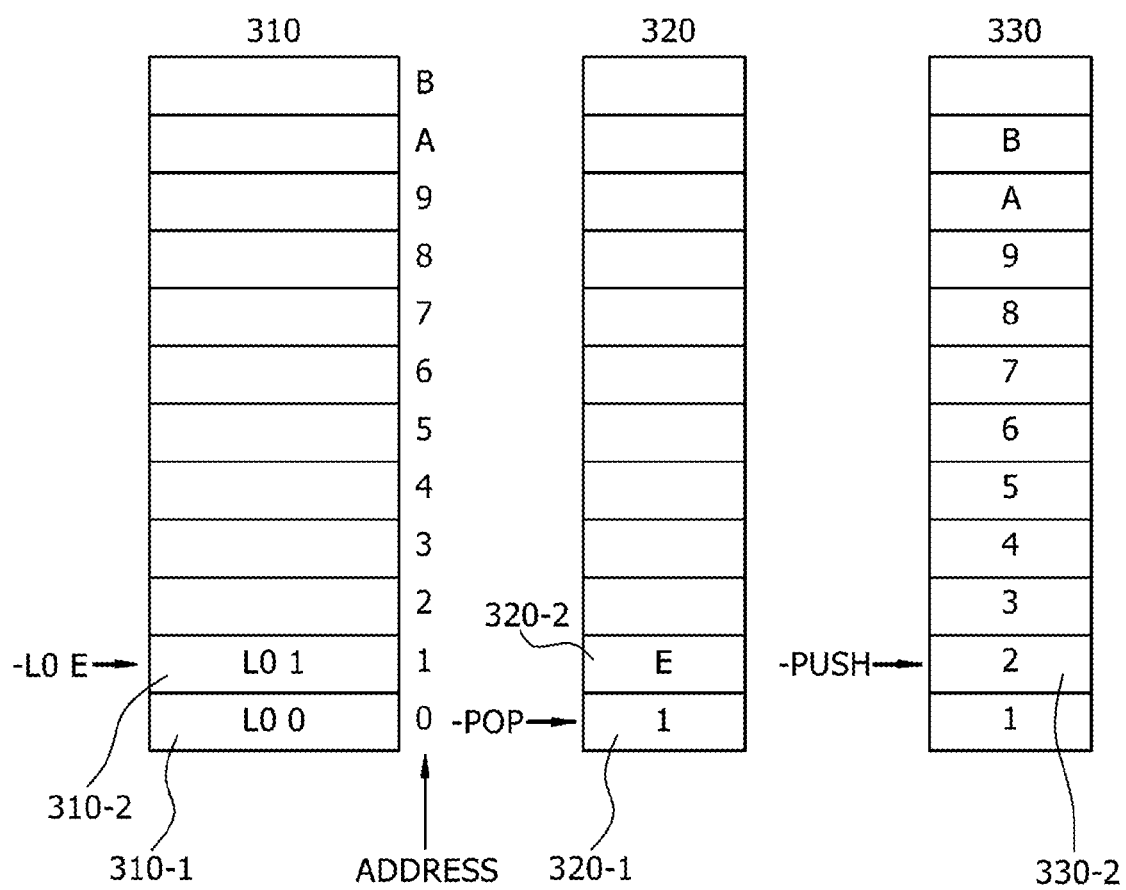

Referring to FIGS. 3, 4 and 6, it may be assumed that a second data L0_1 having the level zero L0 is inputted to the memory stack 310 as the input data after the first data L0_0 of the level zero L0 illustrated in FIG. 5 is stored into the memory stack 310. Since the second data L0_1 of the level zero L0 is not the initial data, the second data L0_1 of the level zero L0 may be stored into a second one 310-2 of the storage elements, which has an address '1' that is stored in the second register 330-1 indicated by the push pointer –PUSH of FIG. 5. The level zero end pointer –L0_E may be recreated to indicate the second one 310-2 of the storage elements, in which the second data L0_1 of the level zero L0 is stored. If the second data L0_1 of the level zero L0 is stored into the second storage element 310-2, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate a second one 330-2 of the second registers, which has an address '2'.

Although the level zero L0 of the second data L0_1 is a highest priority level among the priority levels of the date stored in the memory stack 310 (see the step 417 of FIG. 3), another data having the same priority level as the second data L0_1, that is, the first data L0_0 having the level zero L0 exists in the memory stack 310 (see the step 418 of FIG. 3). Thus, the pop pointer –POP may maintain its previous state without any change. According to the step 423 of FIG. 4, the level zero L0 of the second data L0_1 may correspond to a lowest priority level among the priority levels of the date stored in the memory stack 310. Thus, the end flag data 'E' may be stored into a second one 320-2 of the first registers, which is matched with the second storage element 310-2 in which the second data L0_1 is stored, according to the step 424 of FIG. 4. In addition, the previous end flag data 'E' stored in the first one 320-1 of the first registers may be replaced with the address '1' of the second storage element 310-2 in which the second data L0_1 of the level zero L0 is stored, according to the step 425 of FIG. 4.

Figure 7:
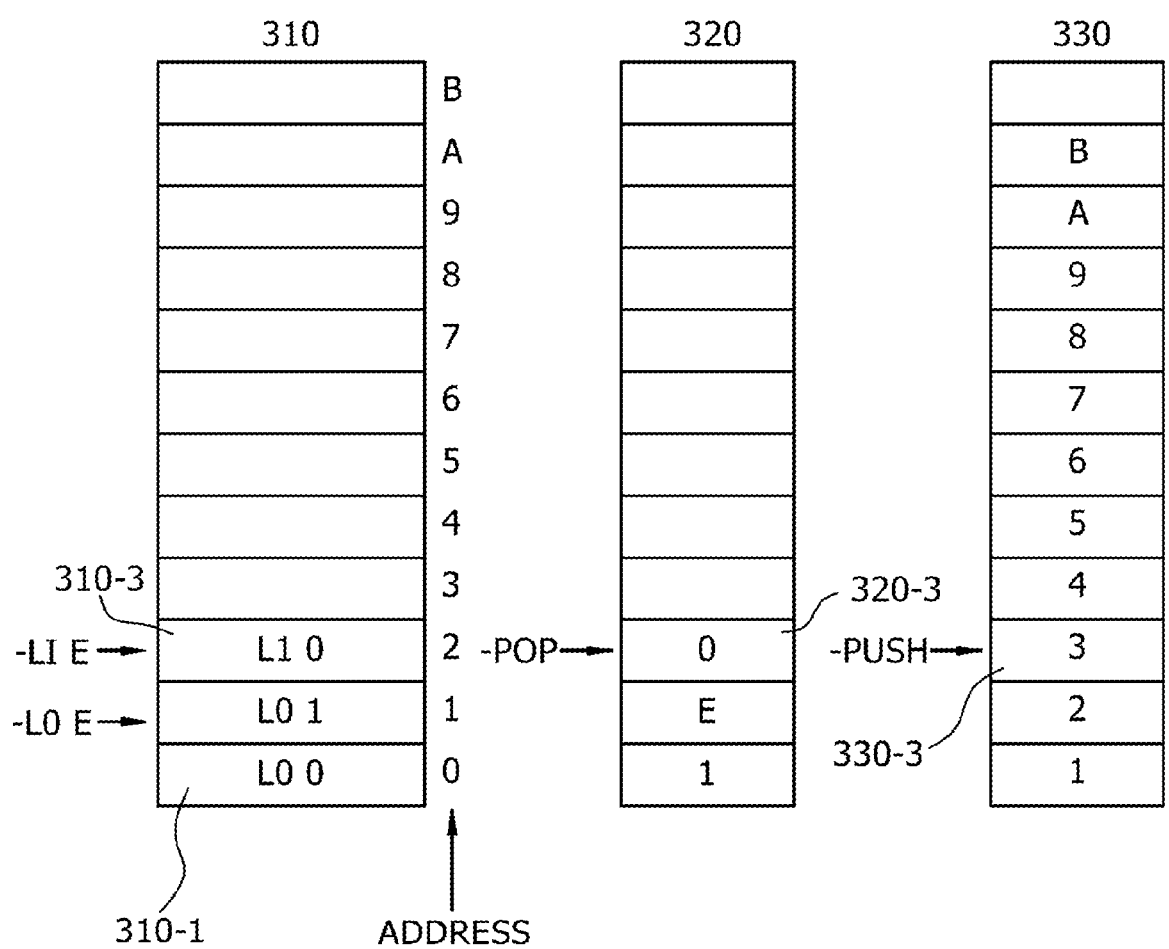

Referring to FIGS. 3, 4 and 7, it may be assumed that a first data L1_0 having the level one L1 is inputted to the memory stack 310 as the input data by a push operation after the second data L0_1 of the level zero L0 illustrated in FIG. 6 is stored into the memory stack 310. Since the first data L1_0 of the level one L1 is not the initial data, the first data L1_0 of the level one L1 may be stored into a third one 310-3 of the storage elements, which has an address '2' that is stored in the second register 330-2 indicated by the push pointer –PUSH of FIG. 6. A level one end pointer –L1_E may be created to indicate the third one 310-3 of the storage elements, in which the first data L1_0 of the level one L1 is stored. If the first data L1_0 of the level one L1 is stored into the third storage element 310-3, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate a third one 330-3 of the second registers, which has an address '3'.

The level one L1 of the first data L1_0 is a highest priority level among the priority levels of the date stored in the memory stack 310 according to the step 417 of FIG. 3, and another data having the same priority level (i.e., the level one L1) as the first data L1_0 do not exist in the memory stack 310 according to the step 418 of FIG. 3. Thus, the pop pointer −POP may be recreated to indicate a third one 320-3 of the first registers, which is matched with the third storage element 310-3 in which the first data L1_0 of the level one L1 is stored, according to the step 419 of FIG. 3. According to the step 423 of FIG. 4, the level one L1 of the first data L1_0 is not a lowest priority level among the priority levels of the date stored in the memory stack 310. Thus, an address '0' of the first storage element 310-1 in which the first data L0_0 of the level zero L0 lower than the level one L1 is stored may be stored into the third one 320-3 of the first registers, which is matched with the third storage element 310-3 in which the first data L1_0 of the level one L1 is stored, according to the step 426 of FIG. 4. No data having the same priority level (i.e., the level one L1) as the first data L1_0 exists among the previous data stored in the memory stack 310 according to the step 418 of FIG. 3. Thus, addresses in the first registers do not change any more.

Figure 8:
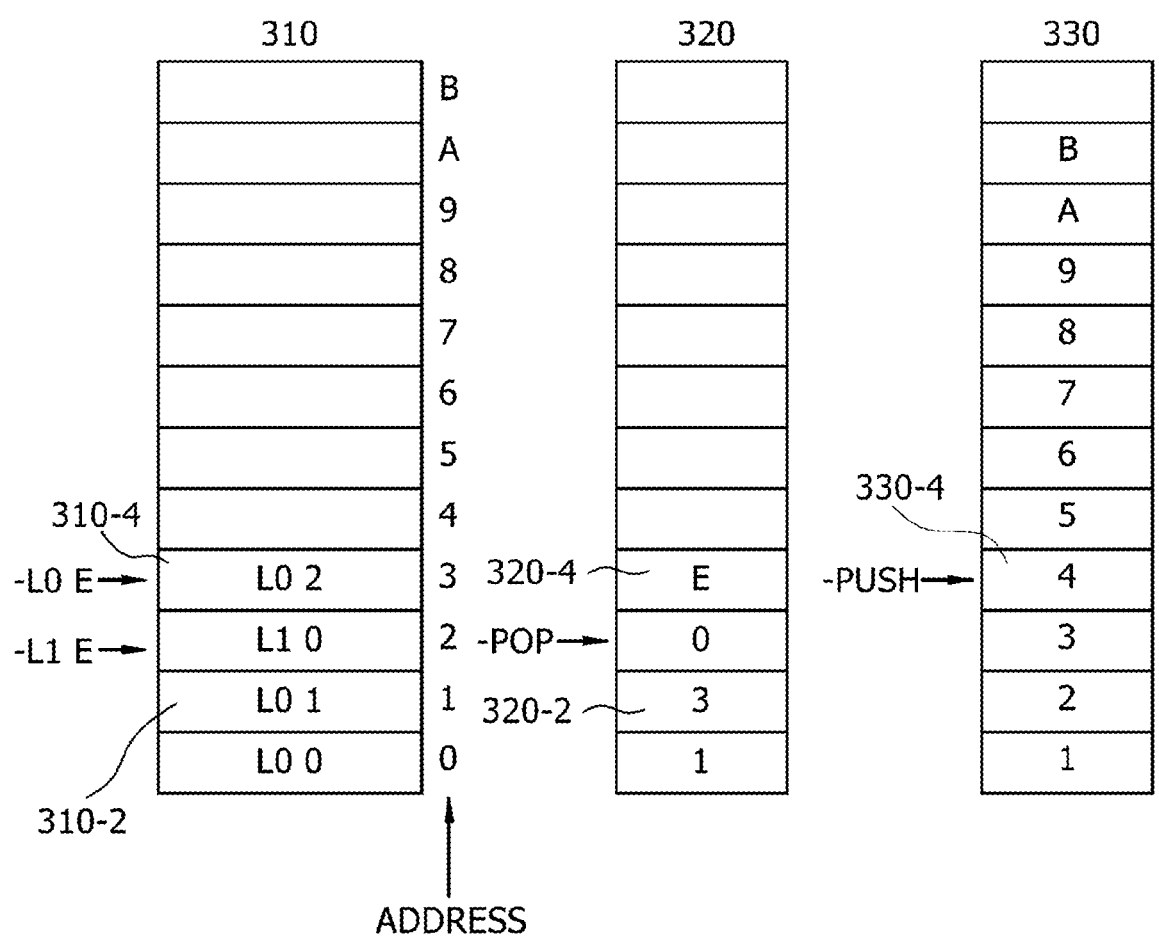

Referring to FIGS. 3, 4 and 8, it may be assumed that a third data L0_2 having the level zero L0 is inputted to the memory stack 310 as the input data by a push operation after the first data L1_0 of the level one L1 illustrated in FIG. 7 is stored into the memory stack 310. Since the third data L0_2 of the level zero L0 is not the initial data, the third data L0_2 of the level zero L0 may be stored into a fourth one 310-4 of the storage elements, which has an address '3' that is stored in the second register 330-3 indicated by the push pointer −PUSH of FIG. 7. The level zero end pointer −L0_E may be recreated to indicate the fourth one 310-4 of the storage elements, in which the third data L0_2 of the level zero L0 is stored. If the third data L0_2 of the level zero L0 is stored into the fourth storage element 310-4, the push pointer −PUSH may be recreated to indicate any one of the second registers, which has an address of a storage element in which a next input data is stored in a subsequent process, according to the step 416 of FIG. 3. That is, the push pointer −PUSH may be recreated to indicate a fourth one 330-4 of the second registers, which has an address '4'.

Since the level zero L0 of the third data L0_2 is not a highest priority level among the priority levels of the data stored in the memory stack 310 (see the step 417 of FIG. 3), the pop pointer −POP may maintain its previous state without any change. According to the step 423 of FIG. 4, the level zero L0 of the third data L0_2 may correspond to a lowest priority level among the priority levels of the date stored in the memory stack 310. Thus, the end flag data 'E' may be stored into a fourth one 320-4 of the first registers, which is matched with the fourth storage element 310-4 in which the third data L0_2 is stored, according to the step 424 of FIG. 4. In addition, the previous end flag data 'E' stored in the second one 320-2 of the first registers may be replaced with the address '3' of the fourth storage element 310-4 in which the third data L0_2 of the level zero L0 is stored, according to the step 425 of FIG. 4.

Figure 9:
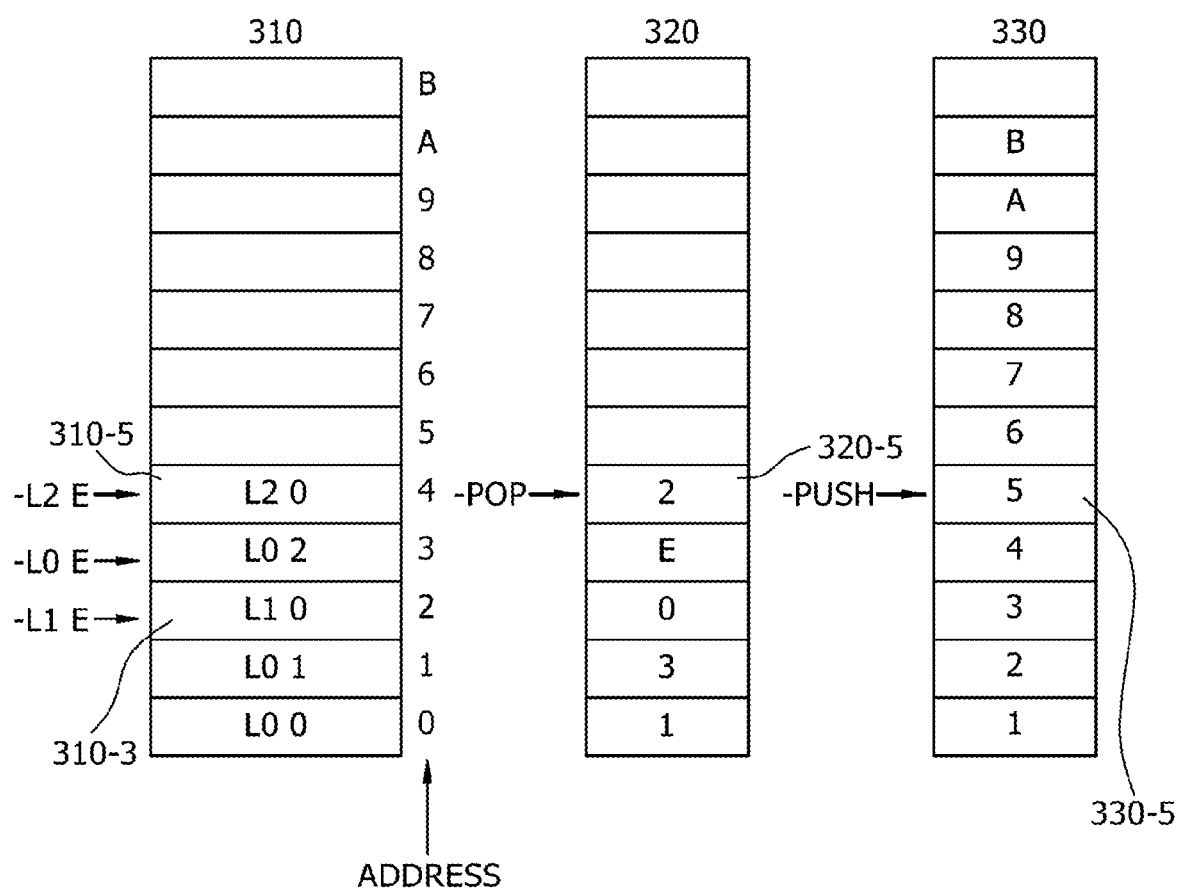

Referring to FIGS. 3, 4 and 9, it may be assumed that a first data L2_0 having the level two L2 is inputted to the memory stack 310 as the input data by a push operation after the third data L0_2 of the level zero L0 illustrated in FIG. 8 is stored into the memory stack 310. Since the first data L2_0 of the level two L2 is not the initial data, the first data L2_0 of the level two L2 may be stored into a fifth one 310-5 of the storage elements, which has an address '4' that is stored in the second register 330-4 indicated by the push pointer −PUSH of FIG. 8. A level two end pointer −L2_E may be created to indicate the fifth one 310-5 of the storage elements, in which the first data L2_0 of the level two L2 is stored. If the first data L2_0 of the level two L2 is stored into the fifth storage element 310-5, the push pointer −PUSH may be recreated to indicate any one of the second registers, which has an address of a storage element in which a next input data is stored in a subsequent process, according to the step 416 of FIG. 3. That is, the push pointer −PUSH may be recreated to indicate a fifth one 330-5 of the second registers, which has an address '5'.

The level two L2 of the first data L2_0 is a highest priority level among the priority levels of the data stored in the memory stack 310 according to the step 417 of FIG. 3, and another data having the same priority level (i.e., the level two L2) as the first data L2_0 do not exist in the memory stack 310 according to the step 418 of FIG. 3. Thus, the pop pointer −POP may be recreated to indicate a fifth one 320-5 of the first registers, which is matched with the fifth storage element 310-5 in which the first data L2_0 of the level two L2 is stored, according to the step 419 of FIG. 3. According to the step 423 of FIG. 4, the level two L2 of the first data L2_0 is not a lowest priority level among the priority levels of the date stored in the memory stack 310. Thus, an address '2' of the third storage element 310-3 in which the first data L1_0 of the level one L1 corresponding to a highest priority level among the priority levels lower than the level two L2 is stored may be stored into the fifth one 320-5 of the first registers, which is matched with the fifth storage element 310-5 storing the first data L2_0 of the level two L2, according to the step 426 of FIG. 4. No data having the same priority level (i.e., the level two L2) as the first data L2_0 exists among the previous data stored in the memory stack 310 according to the step 418 of FIG. 3. Thus, addresses in the first registers do not change any more.

Figure 10:
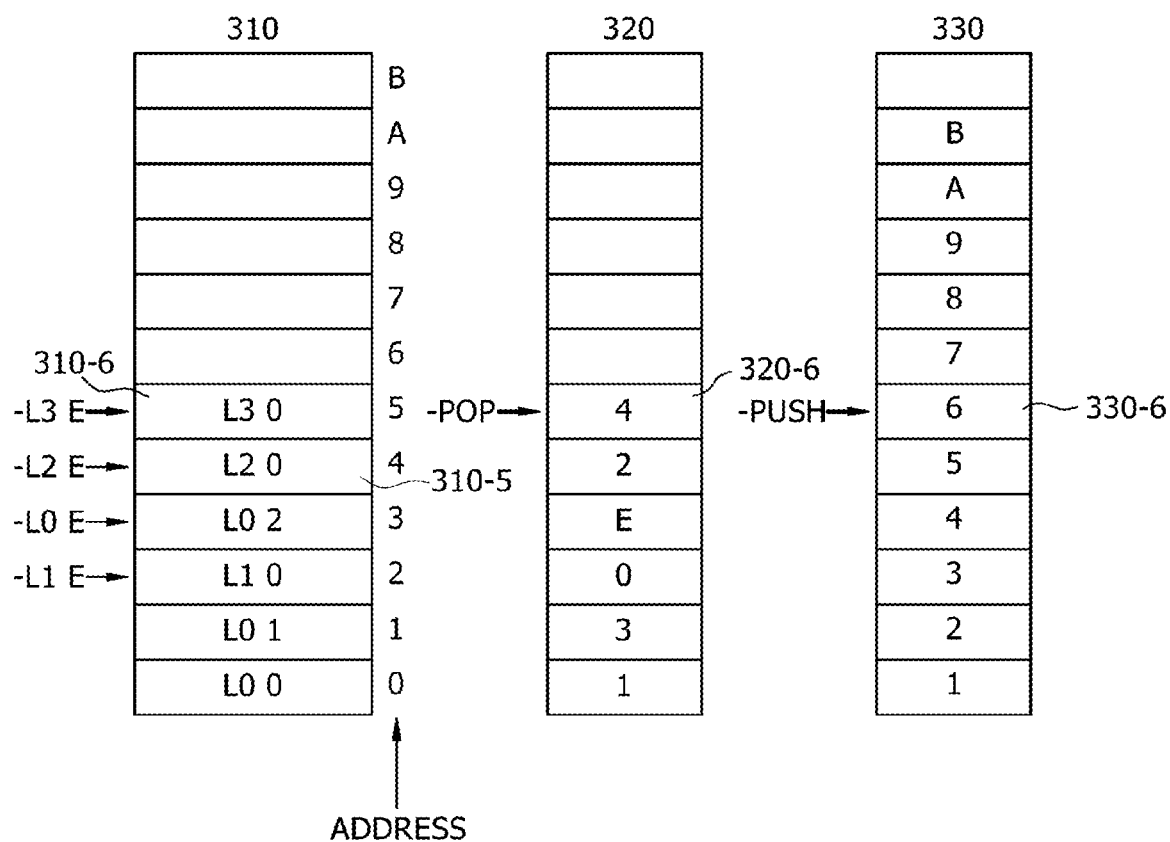

Referring to FIGS. 3, 4 and 10, it may be assumed that a first data L3_0 having the level three L3 is inputted to the memory stack 310 as the input data by a push operation after the first data L2_0 of the level two L2 illustrated in FIG. 9 is stored into the memory stack 310. Since the first data L3_0 of the level three L3 is not the initial data, the first data L3_0 of the level three L3 may be stored into a sixth one 310-6 of the storage elements, which has an address '5' that is stored in the second register 330-5 indicated by the push pointer −PUSH of FIG. 9. A level three end pointer −L3_E may be created to indicate the sixth one 310-6 of the storage elements, in which the first data L3_0 of the level three L3 is stored. If the first data L3_0 of the level three L3 is stored into the sixth storage element 310-6, the push pointer −PUSH may be recreated to indicate any one of the second registers, which has an address of a storage element in which a next input data is stored in a subsequent process, according to the step 416 of FIG. 3. That is, the push pointer −PUSH may be recreated to indicate a sixth one 330-6 of the second registers, which has an address '6'.

The level three L3 of the first data L3_0 is a highest priority level among the priority levels of the date stored in the memory stack 310 according to the step 417 of FIG. 3, and another data having the same priority level (i.e., the level three L3) as the first data L3_0 do not exist in the memory stack 310 according to the step 418 of FIG. 3. Thus, the pop pointer −POP may be recreated to indicate a sixth one 320-6 of the first registers, which is matched with the sixth storage element 310-6 in which the first data L3_0 of the level three L3 is stored, according to the step 419 of FIG. 3. According to the step 423 of FIG. 4, the level three L3 of the first data L3_0 is not a lowest priority level among the priority levels of the date stored in the memory stack 310. Thus, an address '4' of the fifth storage element 310-5 in which the first data L2_0 of the level two L2 corresponding to a highest priority level among the priority levels lower than the level three L3 is stored may be stored into the sixth one 320-6 of the first registers, which is matched with the sixth storage element 310-6 storing the first data L3_0 of the level three L3, according to the step 426 of FIG. 4. No data having the same priority level (i.e., the level three L3) as the first data L3_0 exists among the previous data stored in the memory stack 310 according to the step 418 of FIG. 3. Thus, addresses in the first registers do not change any more.

Figure 11:
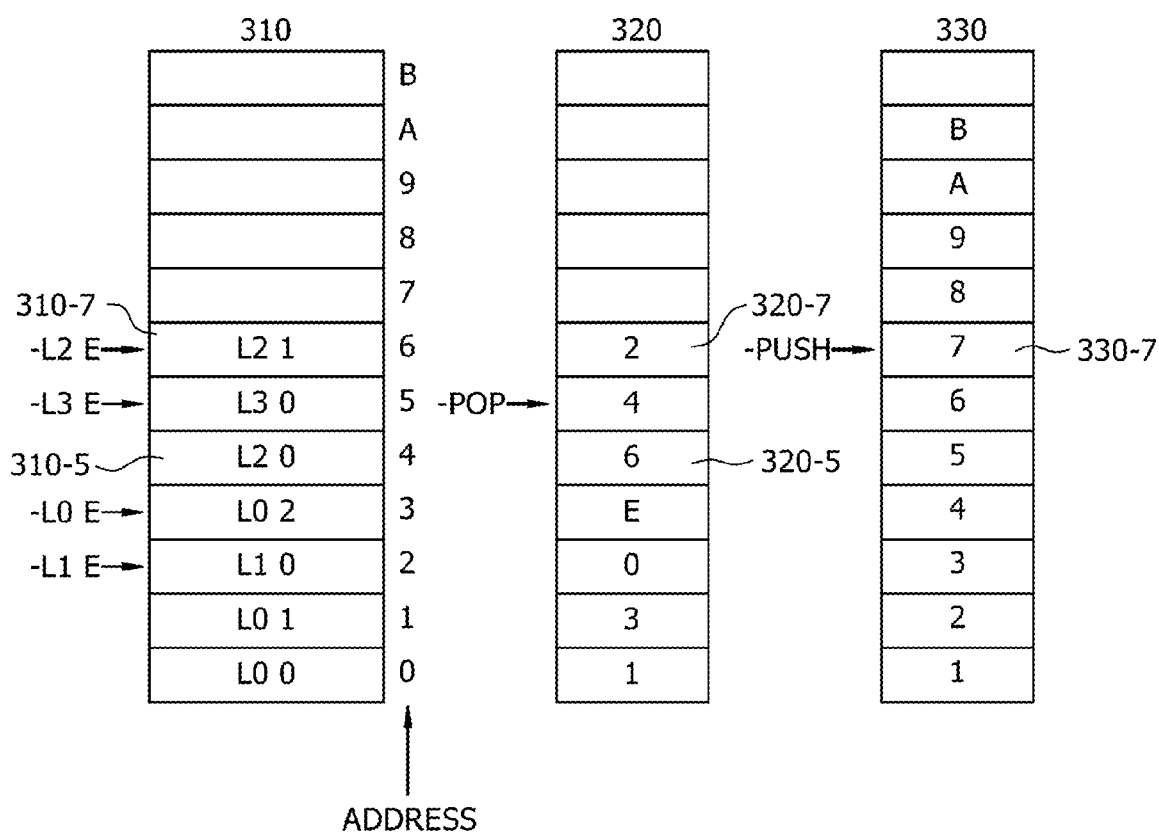

Referring to FIGS. 3, 4 and 11, it may be assumed that a second data L2_1 having the level two L2 is inputted to the memory stack 310 as the input data by a push operation after the first data L3_0 of the level three L3 illustrated in FIG. 10 is stored into the memory stack 310. Since the second data L2_1 of the level two L2 is not the initial data, the second data L2_1 of the level two L2 may be stored into a seventh one 310-7 of the storage elements, which has an address '6' that is stored in the second register 330-6 indicated by the push pointer –PUSH of FIG. 10. The level two end pointer –L2_E may be recreated to indicate the seventh one 310-7 of the storage elements, in which the second data L2_1 of the level two L2 is stored. If the second data L2_1 of the level two L2 is stored into the seventh storage element 310-7, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate a seventh one 330-7 of the second registers, which has an address '7'.

Since the level two L2 of the second data L2_1 is not a highest priority level among the priority levels of the date stored in the memory stack 310 (see the step 417 of FIG. 3), the pop pointer –POP may maintain its previous state without any change. That is, an address stored in the first register indicated by the pop pointer –POP may not be changed. According to the step 423 of FIG. 4, the level two L2 of the second data L2_1 may not be a lowest priority level among the priority levels of the date stored in the memory stack 310. Thus, an address '2' of the third storage element 310-3 storing the first data L1_0 of the level one L1 corresponding to a highest priority level among the priority levels lower than the level two L2 may be stored into a seventh one 320-7 of the first registers, which is matched with the seventh storage element 310-7 in which the second data L2_1 of the level two L2 is stored, according to the step 426 of FIG. 4. According to the step 427 of FIG. 4, the previous data stored in the memory stack 310 may include another data having the same priority level (i.e., the level two L2) as the second data L2_1. Thus, the address '6' of the seventh storage element 310-7 storing the second data L2_1 of the level two L2 may be stored into the fifth one 320-5 of the first registers, which is matched with the fifth storage element 310-5 in which the first data L2_0 of the level two L2 is stored, according to the step 428 of FIG. 4.

Figure 12:
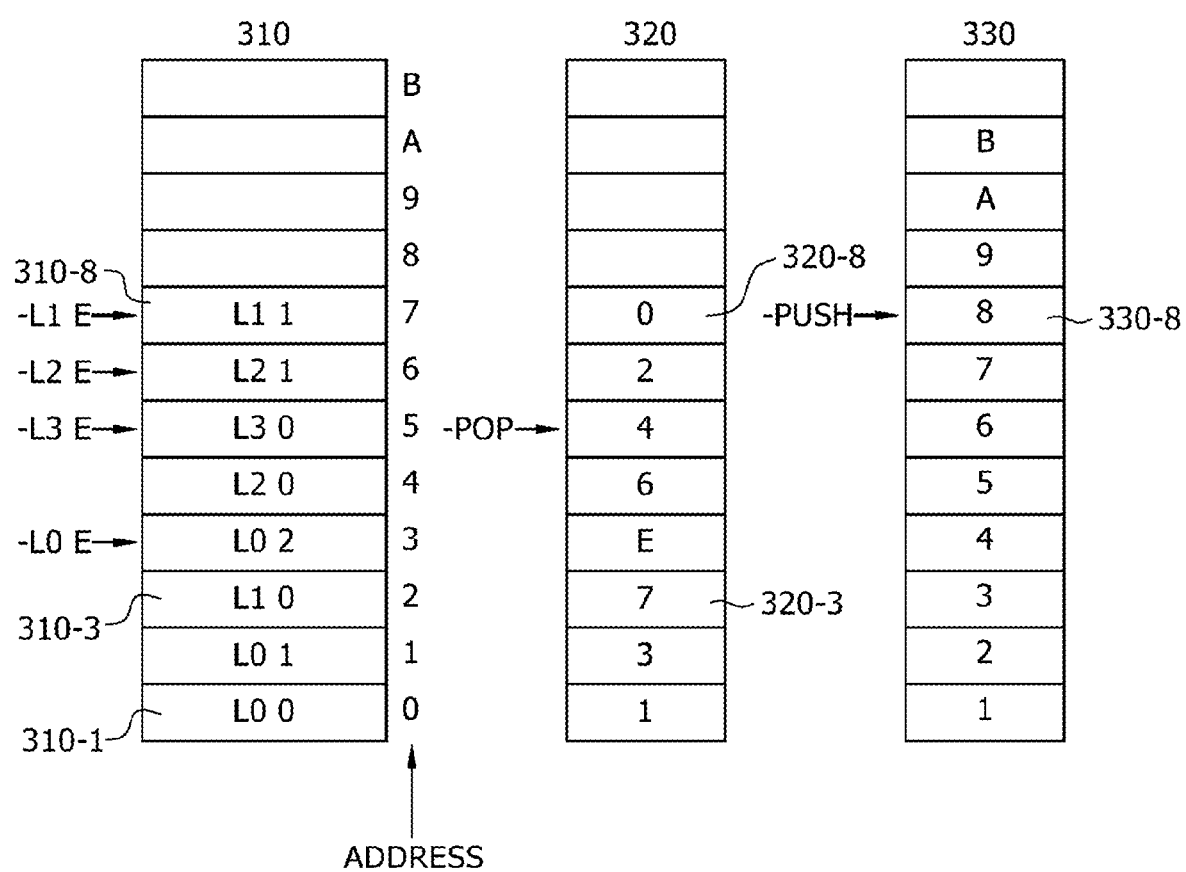

Referring to FIGS. 3, 4, and 12, it may be assumed that a second data L1_1 having the level one L1 is inputted to the memory stack 310 as the input data by a push operation after the second data L2_1 of the level two L2 illustrated in FIG. 11 is stored into the memory stack 310. Since the second data L1_1 of the level one L1 is not the initial data, the second data L1_1 of the level one L1 may be stored into an eighth one 310-8 of the storage elements, which has an address '7' that is stored in the second register 330-7 indicated by the push pointer –PUSH of FIG. 11. The level one end pointer –L1_E may be recreated to indicate the eighth one 310-8 of the storage elements, in which the second data L1_1 of the level one L1 is stored. If the second data L1_1 of the level one L1 is stored into the eighth storage element 310-8, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate an eighth one 330-8 of the second registers, which has an address '8'.

Since the level one L1 of the second data L1_1 is not a highest priority level among the priority levels of the date stored in the memory stack 310 (see the step 417 of FIG. 3), the pop pointer –POP may maintain its previous state without any change. That is, an address stored in the first register indicated by the pop pointer –POP may not be changed. According to the step 423 of FIG. 4, the level one L1 of the second data L1_1 may not be a lowest priority level among the priority levels of the date stored in the memory stack 310. Thus, an address '0' of the first storage element 310-1 storing the first data L0_0 of the level zero L0 lower than the level one L1 may be stored into an eighth one 320-8 of the first registers, which is matched with the eighth storage element 310-8 in which the second data L1_1 of the level one L1 is stored, according to the step 426 of FIG. 4. According to the step 427 of FIG. 4, the previous data stored in the memory stack 310 may include another data having the same priority level (i.e., the level one L1) as the second data L1_1. Thus, the address '7' of the eighth storage element 310-8 storing the second data L1_1 of the level one L1 may be stored into the third one 320-3 of the first registers, which is matched with the third storage element 310-3 in which the first data L1_0 of the level one L1 is stored, according to the step 428 of FIG. 4.

Figure 13:
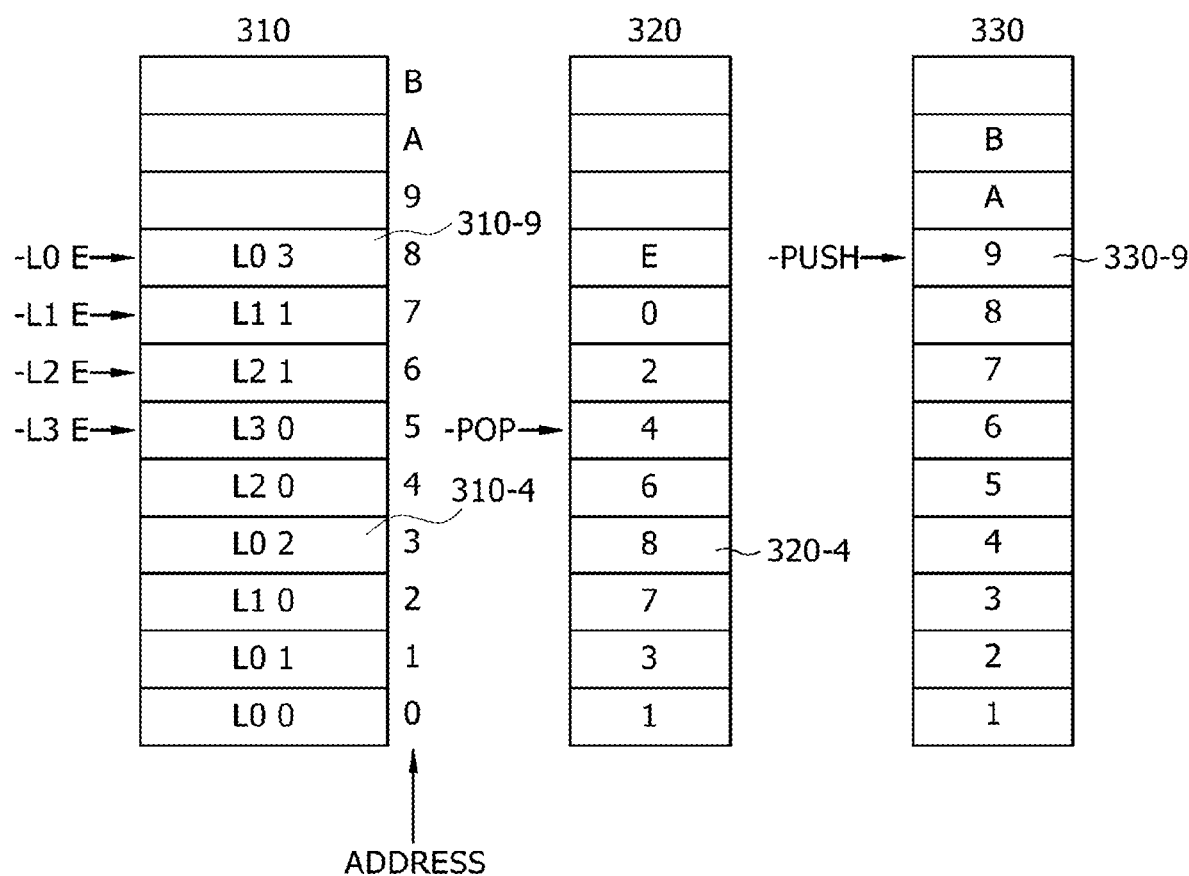

Referring to FIGS. 3, 4 and 13, it may be assumed that a fourth data L0_3 having the level zero L0 is inputted to the memory stack 310 as the input data by a push operation after the second data L1_1 of the level one L1 illustrated in FIG. 12 is stored into the memory stack 310. Since the fourth data L0_3 of the level zero L0 is not the initial data, the fourth data L0_3 of the level zero L0 may be stored into a ninth one 310-9 of the storage elements, which has an address '8' that is stored in the second register 330-8 indicated by the push pointer –PUSH of FIG. 12. The level zero end pointer –L0_E may be recreated to indicate the ninth one 310-9 of the storage elements, in which the fourth data L0_3 of the level zero L0 is stored. If the fourth data L0_3 of the level zero L0 is stored into the ninth storage element 310-9, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate a ninth one 330-9 of the second registers, which has an address '9'.

Since the level zero L0 of the fourth data L0_3 is not a highest priority level among the priority levels of the date stored in the memory stack 310 (see the step 417 of FIG. 3), the pop pointer –POP may maintain its previous state without any change. That is, an address stored in the first register indicated by the pop pointer –POP may not be changed. According to the step 423 of FIG. 4, the level zero L0 of the fourth data L0_3 may correspond to a lowest priority level among the priority levels of the date stored in the memory stack 310. Thus, the end flag data 'E' may move from the fourth one 320-4 of the first registers into a ninth one 320-9 of the first registers, which is matched with the ninth storage element 310-9 storing the fourth data L0_3, according to the step 424 of FIG. 4. Subsequently, the address '8' of the ninth storage element 310-9 storing the fourth data L0_3 of the level zero L0 may be stored into the fourth one 320-4 of the first registers, which is empty by movement of the end flag data 'E', according to the step 425 of FIG. 4.

Figure 14:
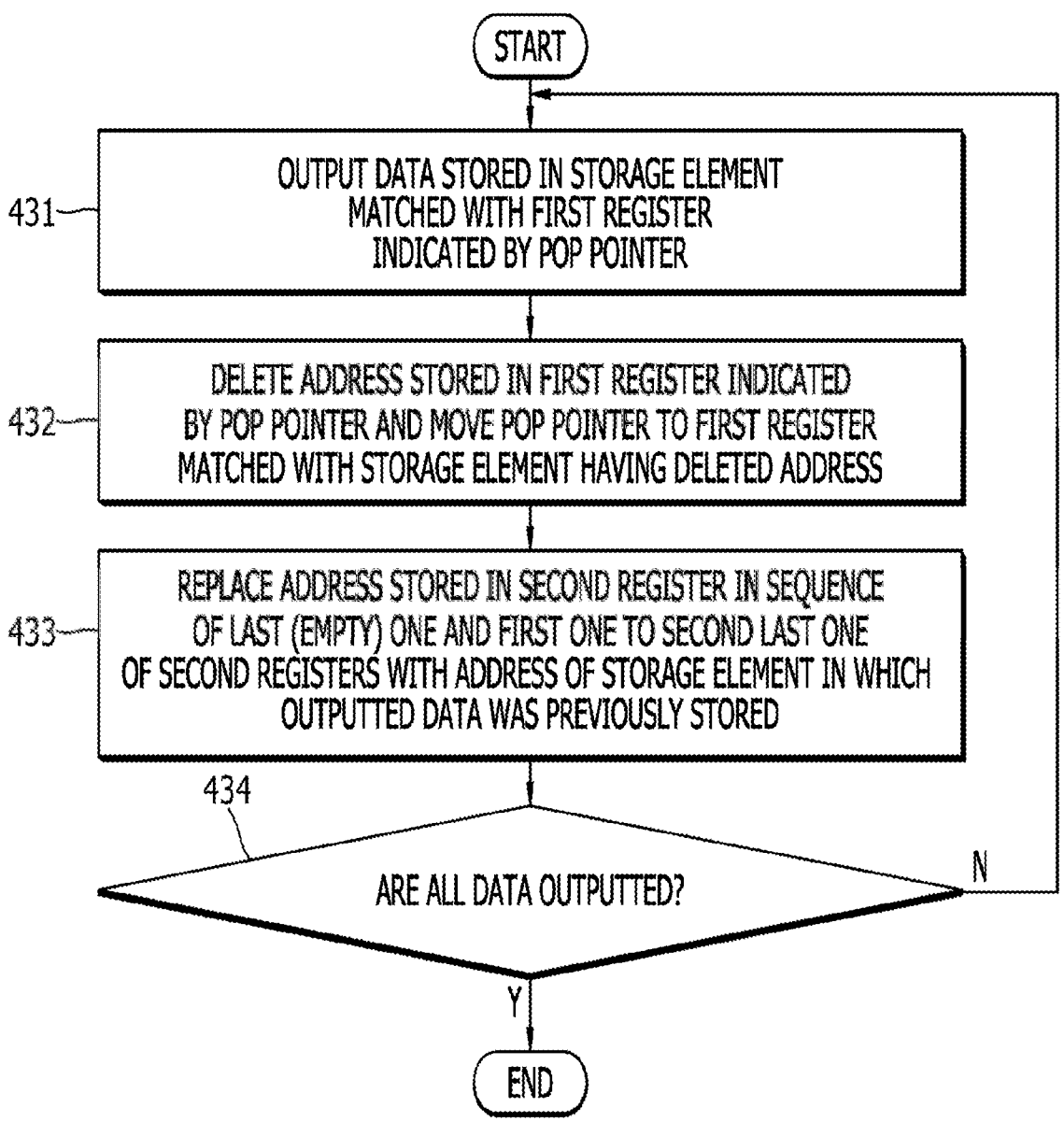
FIG. 14 is a flowchart illustrating a pop operation of a FIFO buffer in which data having different priority levels are stored, according to an embodiment of the present disclosure.

FIG. 14 is a flowchart illustrating the pop operation of the FIFO buffer 300 in which various data having different priority levels are stored, according to an embodiment of the present disclosure. Referring to FIG. 14, if a pop command occurs during the push operation, the data in the storage element matched with the first register indicated by the pop pointer −POP may be outputted (see step 431). An address stored in the first register indicated by the pop pointer −POP may be deleted, and the pop pointer −POP may be moved to any one of the first registers, which is matched with the storage element having the deleted address (see step 432). That is, the pop pointer −POP may be recreated to indicate any one of the first registers, which is matched with the storage element storing a data that has a highest priority level among the data remaining in the memory stack 310 to be firstly outputted in the next pop operation, at the step 432.

Subsequently, an address of any one of the second registers constituting the second register stack 330 may be changed. That is, an address stored in one of the second registers in a sequence of the last empty one and the first one to the second last one of the second registers may be replaced with the address of the storage element in which the outputted data was previously stored (see a step 433). Specifically, if a first data of a highest priority level is outputted from a storage element of the memory stack 310, an address of the storage element may be stored into the last empty one of the second registers. Subsequently, if a second data of the highest priority level or a first data of a priority level lower than the highest priority level is outputted from another storage element of the memory stack 310, the address stored in the first one of the second registers may be replaced with an address of the other storage element. Similarly, the addresses stored in the second one to the second last one of the second registers may be sequentially replaced with addresses of the remaining storage elements whenever the data stored in the remaining storage elements are outputted. Thereafter, whether all of the data stored in the memory stack 310 are outputted may be discriminated (see a step 434). If all of the data stored in the memory stack 310 are outputted at the step 434, the pop operation may terminate. However, if at least one data remains in the memory stack 310 at the step 434, the steps 431, 432, 433 and 434 may be sequentially executed to perform the POP operation.

Figure 15:
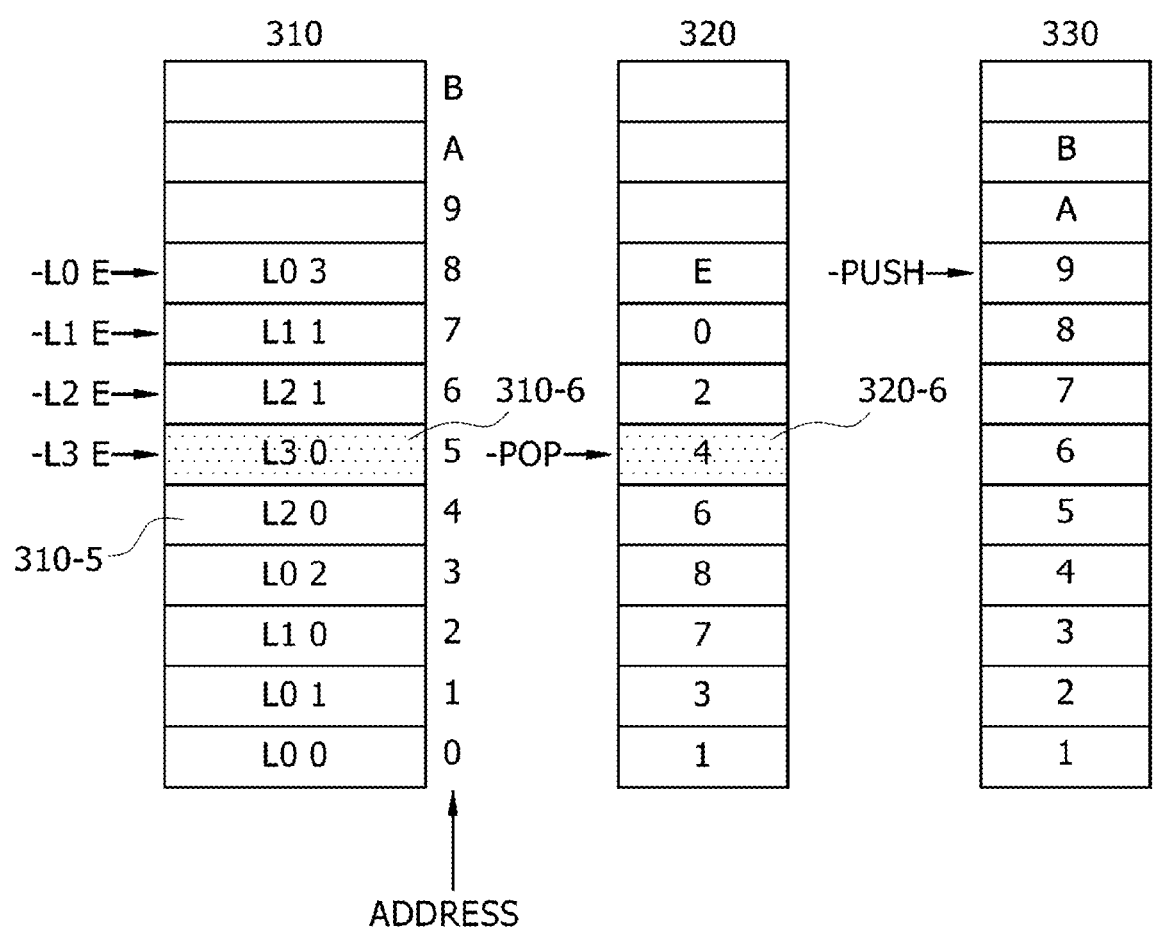
FIGS. 15 to 18 illustrate an example of pop operations of a FIFO buffer included in the FIFO buffer system illustrated in FIG. 1.

FIGS. 15 to 18 illustrate an example of the pop operations of the FIFO buffer 300 included in the FIFO buffer system 100 shown in FIG. 1. The pop operations according to an embodiment may be performed by the pop commands after the initialization operation, the push operations and the pop operations of the FIFO buffer 300 are performed as described with reference to FIGS. 5 to 13. Referring to FIGS. 14 and 15, if the pop command occurs, the FIFO buffer 300 may output the first data L3_0 of the level three L3 stored in the sixth storage element 310-6 that is matched with the sixth one 320-6 of the first registers, which is indicated by the pop pointer −POP, according to the step 431 of FIG. 14. In such a case, the address '4' stored in the sixth one 320-6 of the first registers indicated by the pop pointer −POP may denote an address of a storage element in which a data to be outputted in a next pop operation is stored. For example, the data to be outputted in the next pop operation may correspond to a second data of the same priority level (i.e., the level three L3) as the first data L3_0 of the level three L3 or may be a first data of the level two L2 lower than the level three L3 by one level if the second data of the level three L3 is absent. Accordingly, if the first data L3_0 of the level three L3 is outputted, the data to be outputted in the next pop operation may be the first data L2_0 of the level two L2.

Figure 16:
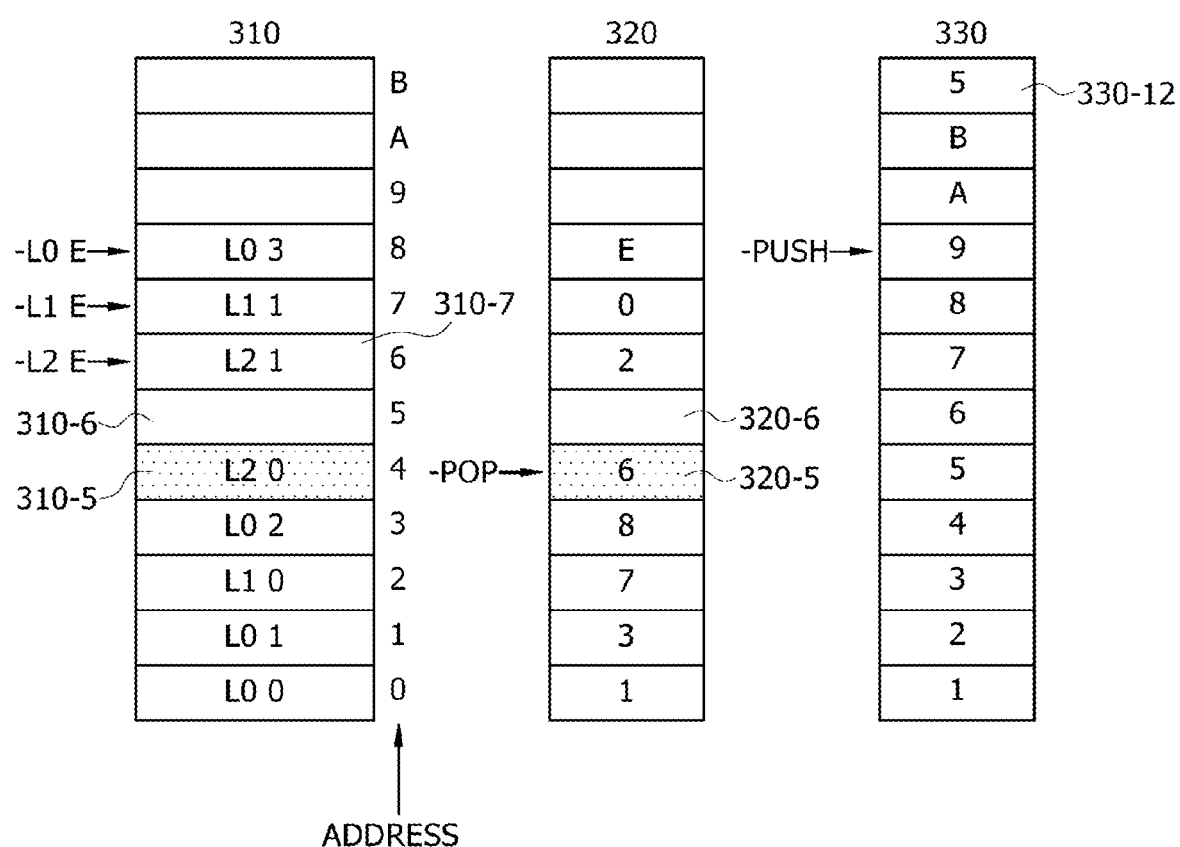

Referring FIGS. 14 and 16, as the first data L3_0 of the level three L3 is outputted from the sixth storage element 310-6, the sixth storage element 310-6 may have an empty state. In addition, the address '4' stored in the sixth one 320-6 of the first registers may deleted according to the step 432 of FIG. 14. In such a case, the pop pointer −POP may be recreated to indicate the fifth one 320-5 of the first registers, which is matched with the fifth storage element 310-5 having the address '4' stored in the sixth one 320-6 of the first registers. In addition, according to the step 433, the address '5' of the sixth storage element 310-6 in which the outputted data L3_0 was previously stored may be stored into the twelfth one 330-12 of the second registers, which has an empty state and the highest-order address.

If all of the data stored in the memory stack 310 are outputted at the step 434 of FIG. 14, the pop operation may terminate. However, if at least one data still remains in the memory stack 310 at the step 434 of FIG. 14, the memory stack 310 may output the first data L2_0 of the level two L2 stored in the fifth storage element 310-5 that is matched with the fifth one 320-5 of the first registers, which is indicated by the pop pointer −POP, according to the step 431 of FIG. 14. In such a case, the address '6' stored in the fifth one 320-5 of the first registers indicated by the pop pointer −POP may denote an address of a storage element in which a data to be outputted in a next pop operation is stored. Accordingly, the data to be outputted in the next pop operation may be the second data L2_1 of the level two L2 stored in the seventh storage element 310-7 having the address '6'.

Figure 17:
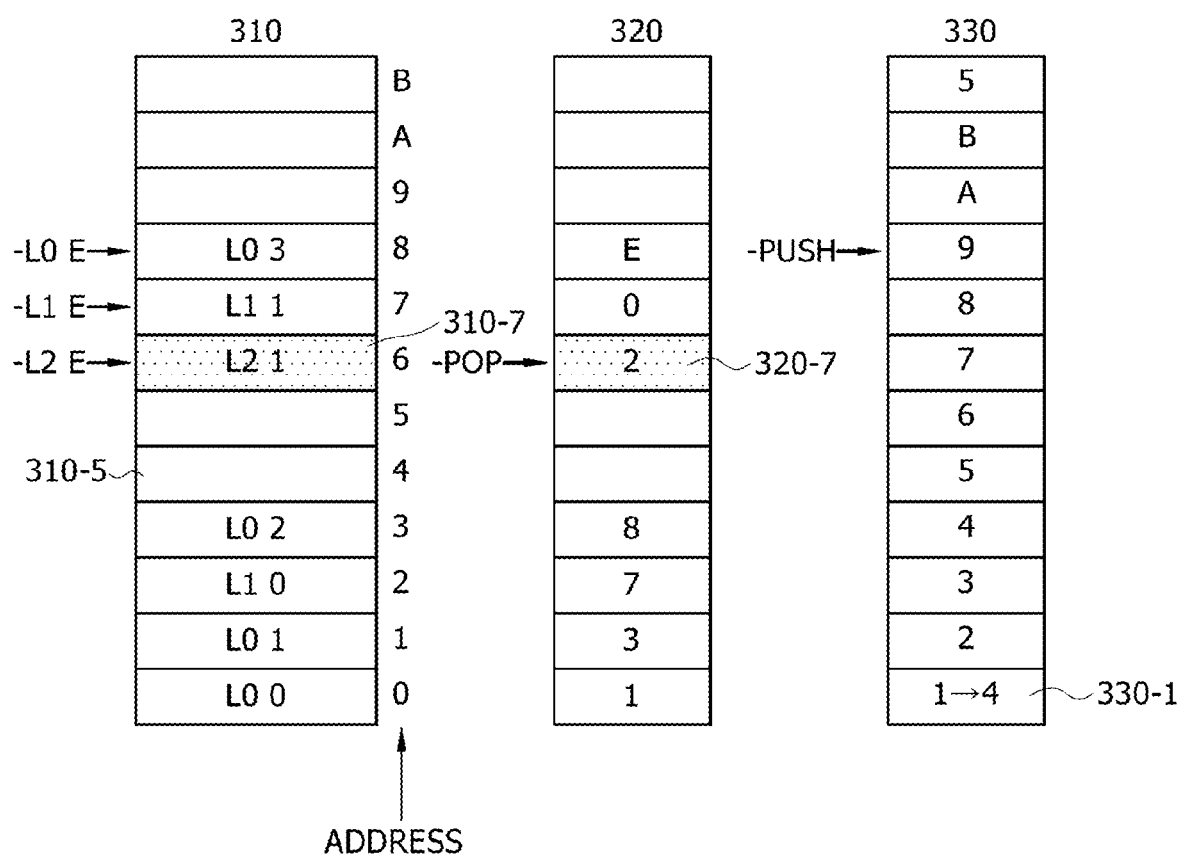

Referring FIGS. 14 and 17, as the first data L2_0 of the level two L2 is outputted from the fifth storage element 310-5, the fifth storage element 310-5 may have an empty state. In addition, the address '6' stored in the fifth one 320-5 of the first registers may deleted according to the step 432 of FIG. 14. In such a case, the pop pointer −POP may be recreated to indicate the seventh one 320-7 of the first registers, which is matched with the seventh storage element 310-7 having the address '6' stored in the fifth one 320-5 of the first registers. In addition, according to the step 433, the address '1' stored in the first one 330-1 of the second registers may be replaced with the address '4' of the fifth storage element 310-5 in which the outputted data L2_0 was previously stored.

If all of the data stored in the memory stack 310 are outputted at the step 434 of FIG. 14, the pop operation may terminate. However, if at least one data still remains in the memory stack 310 at the step 434 of FIG. 14, the memory stack 310 may output the second data L2_1 of the level two L2 stored in the seventh storage element 310-7 that is matched with the seventh one 320-7 of the first registers, which is indicated by the pop pointer −POP, according to the step 431 of FIG. 14. In such a case, the address '2' stored in the seventh one 320-7 of the first registers indicated by the pop pointer −POP may denote an address of a storage element in which a data to be outputted in a next pop operation is stored. Accordingly, the data to be outputted in the next pop operation may be the first data L1_0 of the level one L1 stored in the third storage element 310-3 having the address '2'.

Figure 18:
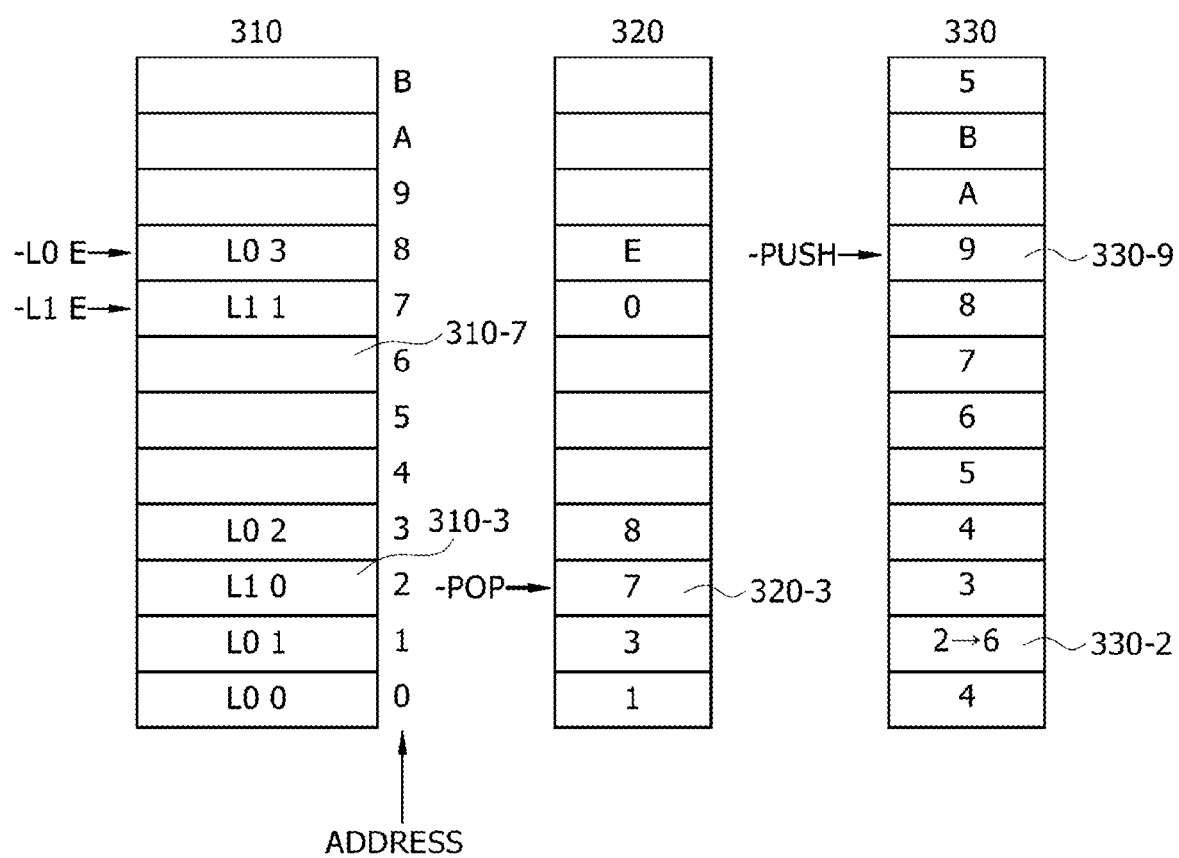

Referring FIGS. 14 and 18, as the second data L2_1 of the level two L2 is outputted from the seventh storage element 310-7, the seventh storage element 310-7 may have an empty state. In addition, the address '2' stored in the seventh one 320-7 of the first registers may deleted according to the step 432 of FIG. 14. In such a case, the pop pointer –POP may be recreated to indicate the third one 320-3 of the first registers, which is matched with the third storage element 310-3 having the address '2' stored in the seventh one 320-7 of the first registers. In addition, according to the step 433, the address '2' stored in the second one 330-2 of the second registers may be replaced with the address '6' of the seventh storage element 310-7 in which the outputted data L2_1 was previously stored.

FIGS. 19 to 23 illustrate an example of push operations of the FIFO buffer 300 storing data, which is included in the FIFO buffer system 100 illustrated in FIG. 1. The push operations illustrated in FIGS. 19 to 23 may be performed with the FIFO buffer 300 illustrated in FIG. 18. The push operations illustrated in FIGS. 19 to 23 may include storing the input data, creating or recreating the pop pointer –POP, and creating the push pointer –PUSH which are executed using the same method as described with reference to FIG. 3 except that the steps 411 to 414 of FIG. 3 are not executed. In addition, the push operations illustrated in FIGS. 19 to 23 may be performed using the same method as described with reference to FIG. 4 except that the steps 421 and 422 of FIG. 4 are not executed.

Figure 19:
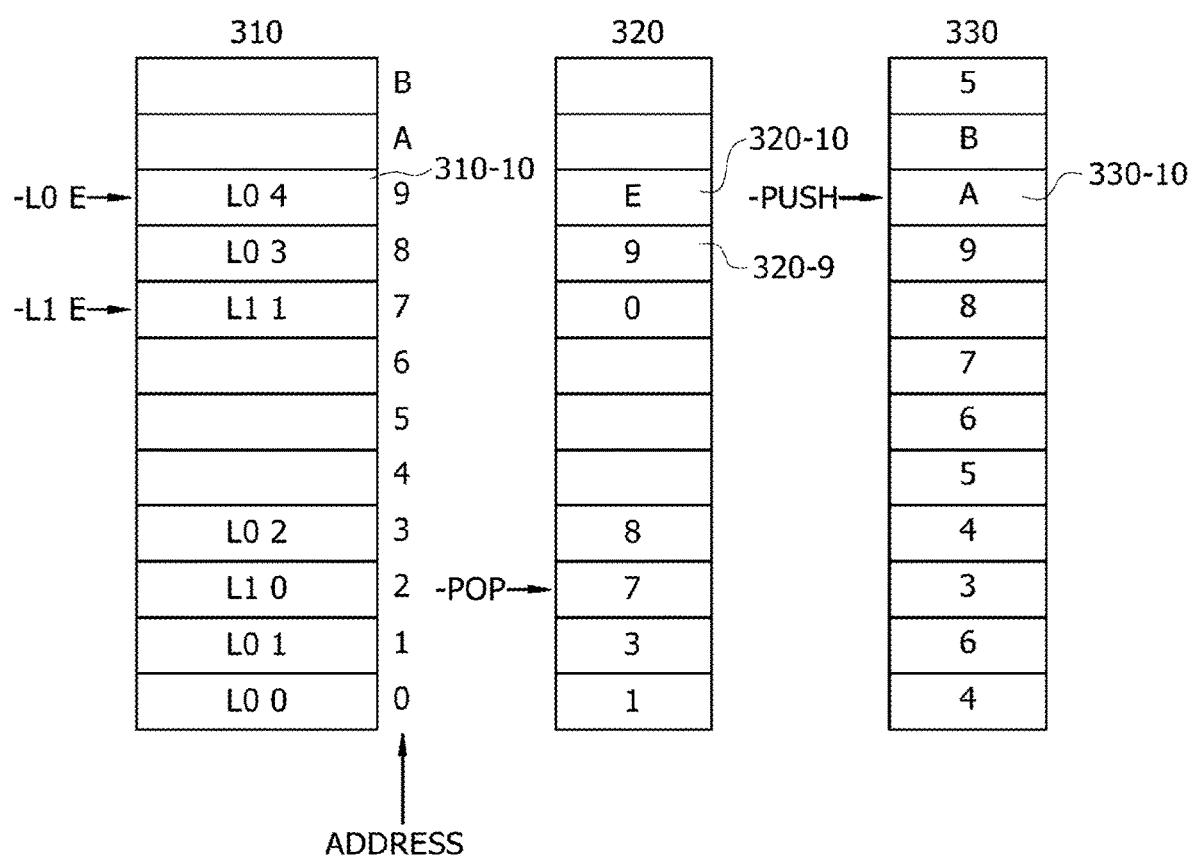
FIGS. 19 to 23 illustrate an example of push operations of a FIFO buffer storing data, which is included in the FIFO buffer system illustrated in FIG. 1.

Referring to FIGS. 3, 4 and 19, it may be assumed that a fifth data L0_4 of the level zero L0 is inputted to the memory stack 310 as the input data by a push operation. According to the step 415 of FIG. 3, the fifth data L0_4 of the level zero L0 may be stored into a tenth one 310-10 of the storage elements, which has an address '9' that is stored in the second register 330-9 indicated by the push pointer –PUSH of FIG. 18. The level zero end pointer –L0_E may be recreated to indicate the tenth one 310-10 of the storage elements, in which the fifth data L0_4 of the level zero L0 is stored. If the fifth data L0_4 of the level zero L0 is stored into the tenth storage element 310-10, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate a tenth one 330-10 of the second registers, which has an address 'A'.

Since the level zero L0 of the fifth data L0_4 is not a highest priority level among the priority levels of the date stored in the memory stack 310 (see the step 417 of FIG. 3), the pop pointer –POP may maintain its previous state without any change. According to the step 423 of FIG. 4, the level zero L0 of the fifth data L0_4 may correspond to a lowest priority level among the priority levels of the date stored in the memory stack 310. Thus, the end flag data 'E' may be stored into a tenth one 320-10 of the first registers, which is matched with the tenth storage element 310-10 in which the fifth data L0_4 is stored, according to the step 424 of FIG. 4. In addition, the previous end flag data 'E' stored in the ninth one 320-9 of the first registers may be replaced with the address '9' of the tenth storage element 310-10 in which the fifth data L0_4 of the level zero L0 is stored, according to the step 425 of FIG. 4.

Figure 20:
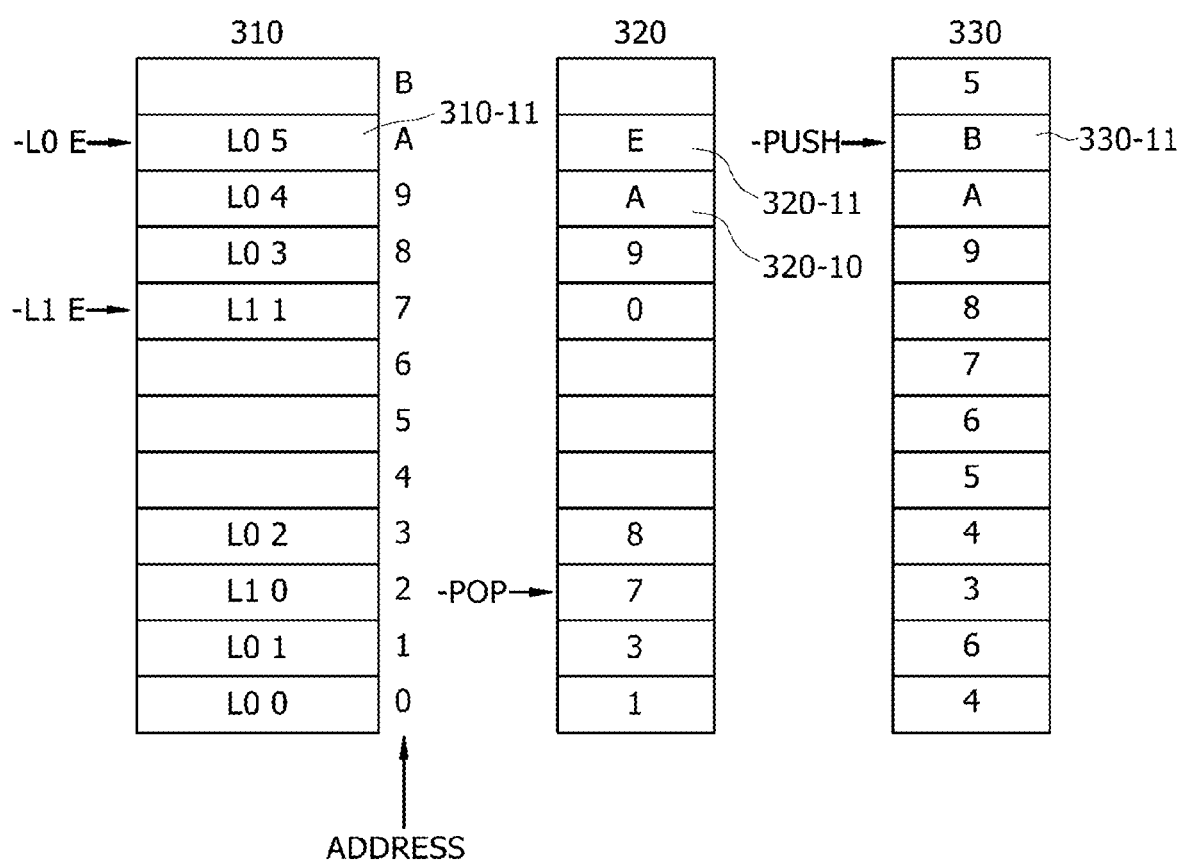

Referring to FIGS. 3, 4 and 20, it may be assumed that a sixth data L0_5 of the level zero L0 is inputted to the memory stack 310 as the input data by a push operation. According to the step 415 of FIG. 3, the sixth data L0_5 of the level zero L0 may be stored into an eleventh one 310-11 of the storage elements, which has an address 'A' that is stored in the second register 330-10 indicated by the push pointer –PUSH of FIG. 19. The level zero end pointer –L0_E may be recreated to indicate the eleventh one 310-11 of the storage elements, in which the sixth data L0_5 of the level zero L0 is stored. If the sixth data L0_5 of the level zero L0 is stored into the eleventh storage element 310-11, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate an eleventh one 330-11 of the second registers, which has an address 'B'.

Since the level zero L0 of the sixth data L0_5 is not a highest priority level among the priority levels of the date stored in the memory stack 310 (see the step 417 of FIG. 3), the pop pointer –POP may maintain its previous state without any change. According to the step 423 of FIG. 4, the level zero L0 of the sixth data L0_5 may correspond to a lowest priority level among the priority levels of the date stored in the memory stack 310. Thus, the end flag data 'E' may be stored into an eleventh one 320-11 of the first registers, which is matched with the eleventh storage element 310-11 in which the sixth data L0_5 is stored, according to the step 424 of FIG. 4. In addition, the previous end flag data 'E' stored in the tenth one 320-10 of the first registers may be replaced with the address 'A' of the eleventh storage element 310-11 in which the sixth data L0_5 of the level zero L0 is stored, according to the step 425 of FIG. 4.

Figure 21:
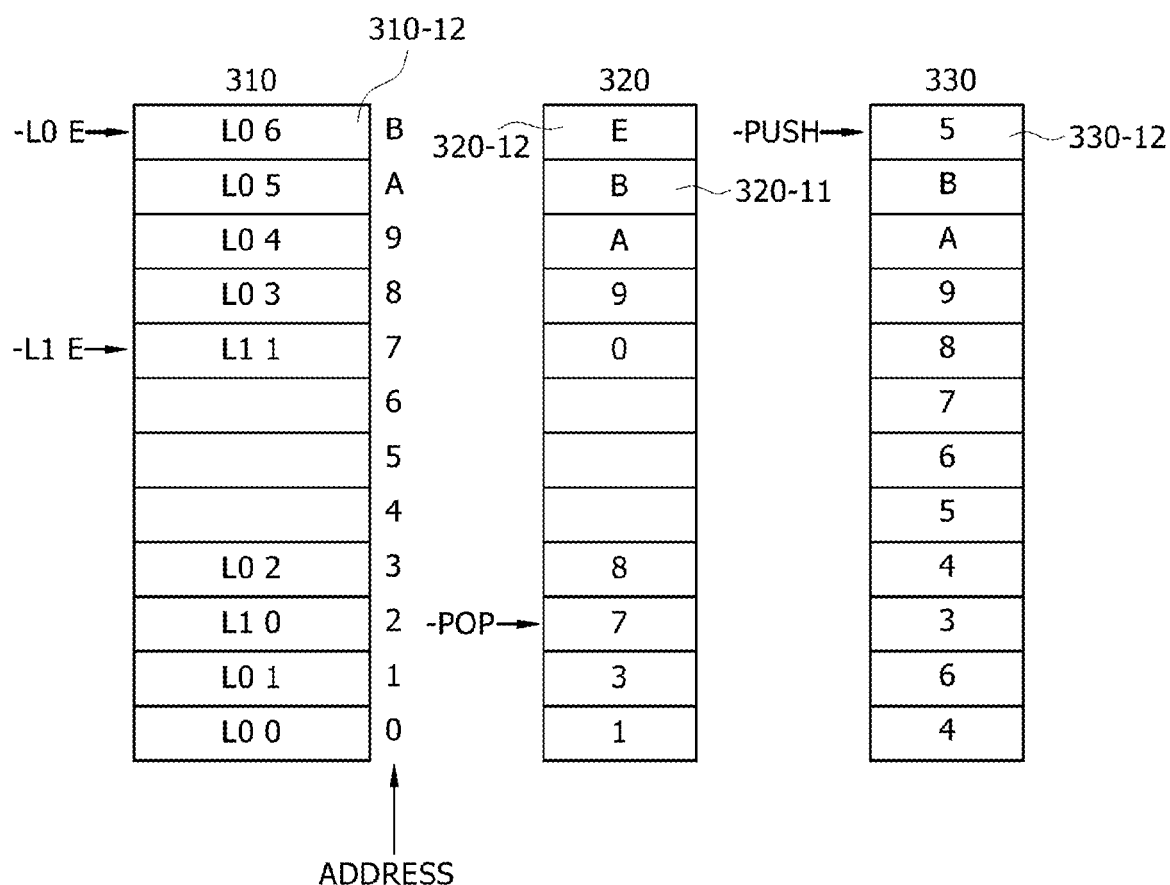

Referring to FIGS. 3, 4 and 21, it may be assumed that a seventh data L0_6 of the level zero L0 is inputted to the memory stack 310 as the input data by a push operation. According to the step 415 of FIG. 3, the seventh data L0_6 of the level zero L0 may be stored into a twelfth one 310-12 of the storage elements, which has an address 'B' that is stored in the second register 330-11 indicated by the push pointer –PUSH of FIG. 20. The level zero end pointer –L0_E may be recreated to indicate the twelfth one 310-12 of the storage elements, in which the seventh data L0_6 of the level zero L0 is stored. If the seventh data L0_6 of the level zero L0 is stored into the twelfth storage element 310-12, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate a twelfth one 330-12 of the second registers, which has an address '5'.

Since the level zero L0 of the seventh data L0_6 is not a highest priority level among the priority levels of the date stored in the memory stack 310 (see the step 417 of FIG. 3), the pop pointer –POP may maintain its previous state without any change. According to the step 423 of FIG. 4, the level zero L0 of the seventh data L0_6 may correspond to a lowest priority level among the priority levels of the date stored in the memory stack 310. Thus, the end flag data 'E' may be stored into a twelfth one 320-12 of the first registers, which is matched with the twelfth storage element 310-12 in which the seventh data L0_6 is stored, according to the step 424 of FIG. 4. In addition, the previous end flag data 'E' stored in the eleventh one 320-11 of the first registers may be replaced with the address 'B' of the twelfth storage element 310-12 in which the seventh data L0_6 of the level zero L0 is stored, according to the step 425 of FIG. 4.

Figure 22:
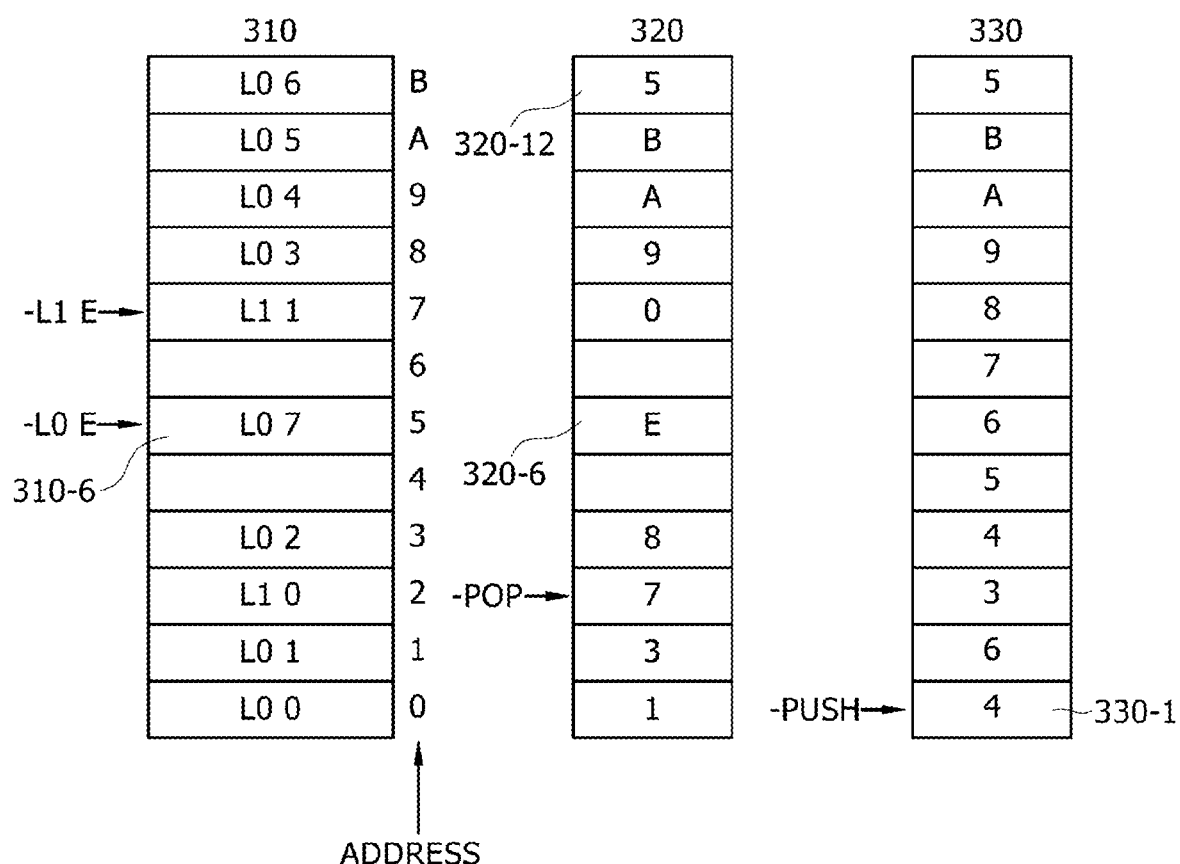

Referring to FIGS. 3, 4 and 22, it may be assumed that an eighth data L0_7 of the level zero L0 is inputted to the memory stack 310 as the input data by a push operation. According to the step 415 of FIG. 3, the eighth data L0_7 of the level zero L0 may be stored into the sixth storage element 310-6 which has the address '5' that is stored in the second register 330-12 indicated by the push pointer –PUSH of FIG. 21. The level zero end pointer –L0_E may be recreated to indicate the sixth storage element 310-6 in which the eighth data L0_7 of the level zero L0 is stored. If the eighth data L0_7 of the level zero L0 is stored into the sixth storage element 310-6, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate the first one 330-1 of the second registers, which has the address '4'.

Since the level zero L0 of the eighth data L0_7 is not a highest priority level among the priority levels of the date stored in the memory stack 310 (see the step 417 of FIG. 3), the pop pointer –POP may maintain its previous state without any change. According to the step 423 of FIG. 4, the level zero L0 of the eighth data L0_7 may correspond to a lowest priority level among the priority levels of the date stored in the memory stack 310. Thus, the end flag data 'E' may be stored into the sixth one 320-6 of the first registers, which is matched with the sixth storage element 310-6 in which the eighth data L0_7 is stored, according to the step 424 of FIG. 4. In addition, the previous end flag data 'E' stored in the twelfth one 320-12 of the first registers may be replaced with the address '5' of the sixth storage element 310-6 in which the eighth data L0_7 of the level zero L0 is stored, according to the step 425 of FIG. 4.

Figure 23:
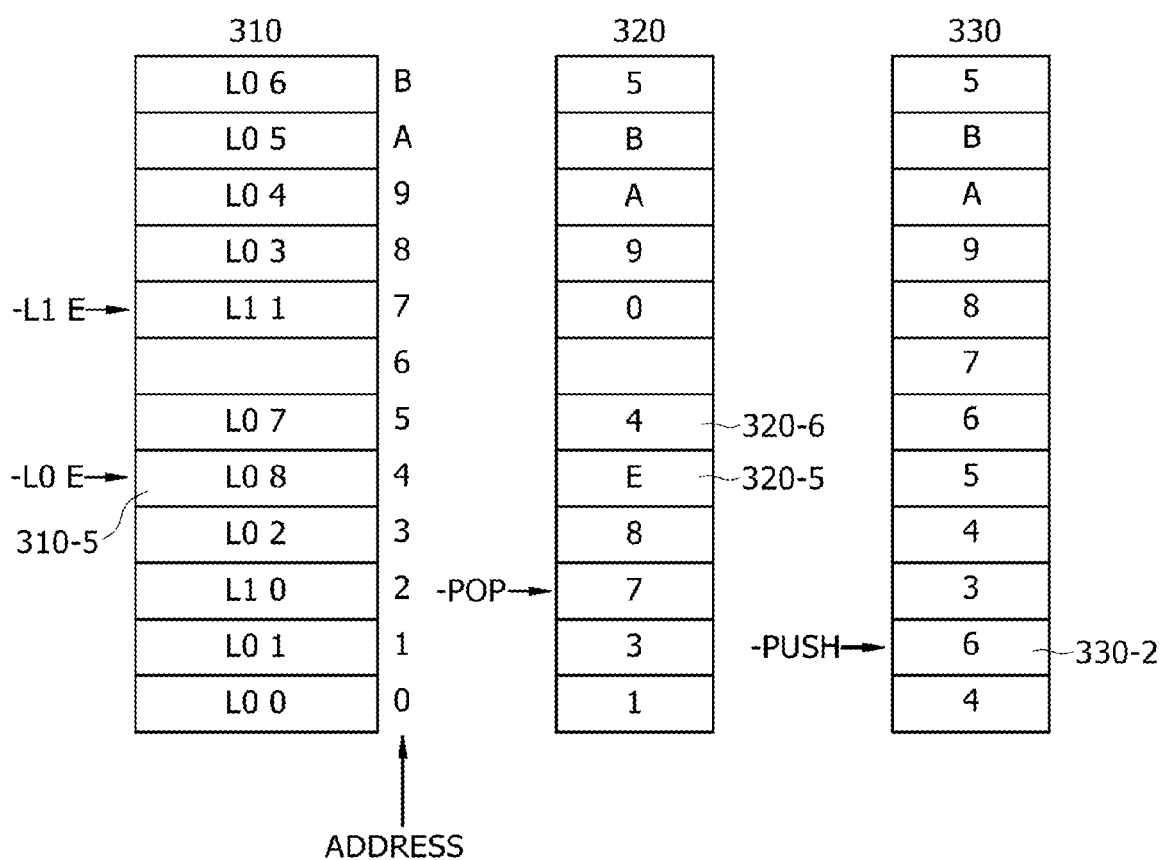

Referring to FIGS. 3, 4 and 23, it may be assumed that a ninth data L0_8 of the level zero L0 is inputted to the memory stack 310 as the input data by a push operation. According to the step 415 of FIG. 3, the ninth data L0_8 of the level zero L0 may be stored into the fifth storage element 310-5 which has the address '4' that is stored in the second register 330-1 indicated by the push pointer –PUSH of FIG. 22. The level zero end pointer –L0_E may be recreated to indicate the fifth storage element 310-5 in which the ninth data L0_8 of the level zero L0 is stored. If the ninth data L0_8 of the level zero L0 is stored into the fifth storage element 310-5, the push pointer –PUSH may be recreated to indicate any one of the second registers, which has an address of a storage element in which a next input data is stored in a subsequent process, according to the step 416 of FIG. 3. That is, the push pointer –PUSH may be recreated to indicate the second one 330-2 of the second registers, which has the address '6'.

Since the level zero L0 of the ninth data L0_8 is not a highest priority level among the priority levels of the date stored in the memory stack 310 (see the step 417 of FIG. 3), the pop pointer –POP may maintain its previous state without any change. According to the step 423 of FIG. 4, the level zero L0 of the ninth data L0_8 may correspond to a lowest priority level among the priority levels of the date stored in the memory stack 310. Thus, the end flag data 'E' may be stored into the fifth one 320-5 of the first registers, which is matched with the fifth storage element 310-5 in which the ninth data L0_8 is stored, according to the step 424 of FIG. 4. In addition, the previous end flag data 'E' stored in the sixth one 320-6 of the first registers may be replaced with the address '4' of the fifth storage element 310-5 in which the ninth data L0_8 of the level zero L0 is stored, according to the step 425 of FIG. 4.

As described above, FIGS. 5 to 13 illustrate the push operations performed after the FIFO buffer 300 is initialized, FIGS. 15 to 18 illustrate the pop operations applied to the FIFO buffer 300 of FIG. 13, and FIGS. 19 to 23 illustrate the push operations applied to the FIFO buffer 300 of FIG. 18. During the push operations described above, the data inputted to the FIFO buffer 300 may be stored into the first to twelfth storage elements constituting the memory stack 310 regardless of the priority levels of the input data. In addition, during the pop operations, the data stored in the memory stack 310 may be sequentially outputted in order of their priority levels from the highest priority level to the lowest priority level to control the QoS of the FIFO buffer system 100. If the twelve storage elements of the memory stack 310 are classified into four groups and if each group is provided to have three among the twelve storage elements and to have one among four priority levels, at the most three input data having the same priority level may be stored into the memory stack 310. However, according to the embodiments of the present disclosure, nine input data having the same priority level, for example, the level zero L0 may be respectively stored into nine of the twelve storage elements constituting the memory stack 310, as illustrated in FIG. 23.

The FIFO buffer system 100 according to an embodiment of the present disclosure may be equally applicable to various electronic systems. For example, the FIFO buffer system 100 may be used to control the QoS of a bus architecture such as an advanced extensible interface (AXI) or an interface architecture such as a peripheral component interconnect express (PCIe). In the event that the FIFO buffer system 100 is applied to the PCIe, the FIFO buffer system 100 may be applicable to an architecture for performing FIFO buffer operations of data which are transmitted through virtual channels VCs having different priority levels in a transaction layer that transmits a request outputted from a software layer using a packet-based spilt-transaction protocol to an input/output (I/O) device. If the FIFO buffer system 100 is applied to the bus architecture such as the AXI or the interface architecture such as the PCIe, a storage capability of a single memory stack may be fully utilized when the input data having various different priority levels are stored into the single memory stack and the QoS of the FIFO buffer system 100 may be controlled such that the input data stored in the single memory stack are sequentially outputted in order of the priority level from the highest priority level to the lowest priority level when the input data are outputted from the single memory stack.

According to the above embodiments, even though input data are stored into a memory stack included in a FIFO buffer regardless of priority levels of the input data during push operations, the input data stored in the memory stack may be sequentially outputted in order of the priority levels from the highest priority level to the lowest priority level during pop operations to control the QoS. As a result, a storage capability of the memory stack may be fully utilized without any restrictions of the priority levels of the input data regardless of an amount of the input data having the same priority level.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:

1. A buffer system comprising:
   a buffer configured to store an sorted data into a plurality of groups respectively corresponding to a plurality of priority levels and configured to output the stored data according to a first-in first-out (FIFO) scheme for a priority level,
   wherein the buffer includes:
   a memory stack configured to include a plurality of storage elements, each of which stores one of the sorted data;
   a first register stack configured to include information on an output sequence of data stored in the plurality of storage elements; and
   a second register stack configured to include information on a storage location of the sorted data outputted from the classifier when the sorted data are stored into the plurality of storage elements,
   wherein the first register stack includes a plurality of first registers;
   wherein the second register stack includes a plurality of second registers; and
   wherein the number of the first registers is equal to or greater than the number of the storage elements, and the number of the first registers is equal to or greater than the number of the second registers.

2. The buffer system of claim 1, wherein if the input data is stored into a certain storage element among the plurality of storage elements, a level end pointer of the priority level of the input data is created to indicate the certain storage element in which the input data is stored.

3. The buffer system of claim 1,
   wherein if the input data is stored into a certain storage element among the plurality of storage elements, an address of the storage element storing a data having a priority level lower than the priority level of the input data stored in the certain storage element is stored into any one of the plurality of first registers.

4. The buffer system of claim 1,
   wherein if a data is outputted from a certain storage element among the plurality of storage elements, an address of the certain storage element is stored into one of the plurality of second registers.

5. The buffer system of claim 1,
   wherein the first registers are matched with the storage elements, respectively; and
   wherein the second registers are matched with the storage elements, respectively.

6. The buffer system of claim 5, wherein one of the first registers, one of the second registers and one of the storage elements which are matched with one another have the same address.

7. The buffer system of claim 1,
   wherein all of the storage elements and the first registers have an empty state if the buffer is initialized; and
   wherein if the buffer is initialized, a second lowest-order address to a highest-order address of the storage elements are respectively stored into the second registers having a lowest-order address to a second highest-order address; and
   wherein if the buffer is initialized, the second register having a highest-order address has an empty state.

8. The buffer system of claim 1,
   wherein if the input data is an initial data that is firstly inputted to the memory stack after the buffer is initialized, the input data is stored into a first storage element having a lowest-order address among the storage elements, a push pointer is created to indicate a first one of the second registers, which is matched with the first storage element, and a pop pointer is created to indicate a first one of the first registers, which is matched with the first storage element.

9. The buffer system of claim 8,
   wherein an end flag data is stored into a first one of the first registers, which is matched with the first storage element;
   wherein the input data stored in the first storage element matched with the first register storing the end flag data means a last data among data stored in the memory stack.

10. The buffer system of claim 9,
    wherein the input data stored in the first storage element matched with the first register indicated by the pop pointer is outputted based on a pop command;
    wherein an address stored in the first register indicated by the pop pointer is deleted, and the pop pointer is recreated to indicate the first register matched with the first storage element having the deleted address; and
    wherein an address of the storage element in which the outputted data was previously stored is stored into the empty second register having the highest-order address among the second registers.

11. The buffer system of claim 1,
    wherein if the input data is not an initial data that is firstly inputted to the memory stack after the buffer is initialized, the input data is stored into the storage element having an address stored in a certain second register indicated by a push pointer among the second registers, and the push pointer is recreated to indicate another second register having an address greater than the address of the certain second register.

12. The buffer system of claim 11, wherein if a priority level of the input data is higher than the priority levels of the previous data stored in the memory stack, a pop pointer is created to indicate one of the first registers, which is matched with the storage element in which the input data is stored.

13. The buffer system of claim 12,
    wherein the input data stored in the storage element matched with the first register indicated by the pop pointer is outputted in response to a pop command;
    wherein an address stored in the first register indicated by the pop pointer is deleted, and the pop pointer is recreated to indicate the first register matched with the storage element having the deleted address; and
    wherein an address of the storage element in which the outputted data was previously stored is stored into any one of the second registers.

14. The buffer system of claim 1,
    wherein if the input data is not an initial data that is firstly inputted to the memory stack after the buffer is initialized and the input data has a lowest priority level among the priority levels of the previous data stored in the memory stack, an end flag data is stored into the first register which is matched with the storage element storing the input data, and an address of the storage element storing the input data is stored into the first register in which the end flag data was previously stored; and
    wherein the end flag data is provided to indicate a last one of the data having a lowest priority level among the priority levels of the data stored in the memory stack.

15. The buffer system of claim 14,
wherein the input data stored in the storage element matched with the first register indicated by a pop pointer is outputted based on a pop command;
wherein an address stored in the first register indicated by the pop pointer is deleted, and the pop pointer is recreated to indicate the first register matched with the storage element having the deleted address; and
wherein an address of the storage element in which the outputted data was previously stored is stored into any one of the second registers.

16. The buffer system of claim 1,
wherein if the input data is not an initial data that is firstly inputted to the memory stack after the buffer is initialized and a priority level of the input data is not a lowest priority level among the priority levels of the previous data stored in the memory stack, an address of the storage element storing a first one of the data having a highest priority level among the priority levels lower than the priority level of the input data is stored into the first register matched with the storage element in which the input data is stored.

17. The buffer system of claim 16, wherein if at least one data having the same priority level as the input data is present in the previous data stored in the memory stack, an address of the storage element storing the input data is stored into the first register which is matched with the storage element in which a last one among the data having the same priority level as the input data is stored.

18. The buffer system of claim 17,
wherein the input data stored in the storage element matched with the first register indicated by a pop pointer is outputted in response to a pop command;
wherein an address stored in the first register indicated by the pop pointer is deleted, and the pop pointer is recreated to indicate the first register matched with the storage element having the deleted address; and
wherein an address of the storage element in which the outputted data was previously stored is stored into any one of the second registers.

19. The buffer system of claim 1,
wherein the buffer system is implemented with a FIFO buffer system architecture, and
wherein the buffer is implemented with a FIFO buffer architecture.

* * * * *